United States Patent
Jiang et al.

(10) Patent No.: US 10,192,214 B2
(45) Date of Patent: Jan. 29, 2019

(54) PENDING DEPOSIT FOR PAYMENT PROCESSING SYSTEM

(71) Applicant: GOOGLE INC., Mountain View, CA (US)

(72) Inventors: Fan Jiang, Adliswil (CH); Aneto Pablo Okonkwo, Zurich (CH); Michael William Springer, Zurich (CH); Gökhan Hasan Bakir, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 673 days.

(21) Appl. No.: 13/794,747

(22) Filed: Mar. 11, 2013

(65) Prior Publication Data

US 2014/0258109 A1     Sep. 11, 2014

(51) Int. Cl.
*G06Q 20/34* (2012.01)
*G06Q 20/06* (2012.01)
(Continued)

(52) U.S. Cl.
CPC ....... *G06Q 20/341* (2013.01); *G06Q 20/0655* (2013.01); *G06Q 20/349* (2013.01);
(Continued)

(58) Field of Classification Search
CPC . G06Q 20/349; G06Q 20/352; G06Q 20/3672
See application file for complete search history.

(56) References Cited

U.S. PATENT DOCUMENTS

| | | |
|---|---|---|
| 4,977,595 A | 12/1990 | Ohta et al. |
| 5,185,695 A | 2/1993 | Pruchnicki |

(Continued)

FOREIGN PATENT DOCUMENTS

| | | |
|---|---|---|
| CN | 101719247 A | 6/2010 |
| CN | 102289893 A | 12/2011 |

(Continued)

OTHER PUBLICATIONS

Bruce Schneier, "Applied Cryptography", Copyright 1996, John Wiley & Sons, Inc., Second Edition.*

(Continued)

*Primary Examiner* — Steven S Kim
(74) *Attorney, Agent, or Firm* — Johnson, Marcou & Issacs, LLC

(57) ABSTRACT

Depositing funds onto smart cards for use during processing of purchases. A device creates a deposit request and transmits the request to a remote system. The remote system processes the request and transmits a deposit record to the device, which in turn transmits the record to the smart card. If the device has network access, it transmits a deposit confirmation to the remote system, which updates the smart card account to include the confirmation. If the device unable to connect to the remote system, the deposit confirmation is transmitted when the smart card is involved in a future transaction. During the future transaction, the smart card transmits its transaction history, which comprises the deposit confirmation, to the device, and the device transmits the transaction history to the remote system. The remote system updates the smart card account to include the deposit confirmation.

17 Claims, 13 Drawing Sheets

(51) Int. Cl.
*G06Q 20/36* (2012.01)
*G06Q 20/38* (2012.01)
*G06Q 20/40* (2012.01)
*G07F 7/10* (2006.01)

(52) U.S. Cl.
CPC ....... *G06Q 20/3433* (2013.01); *G06Q 20/352* (2013.01); *G06Q 20/354* (2013.01); *G06Q 20/3552* (2013.01); *G06Q 20/3672* (2013.01); *G06Q 20/3674* (2013.01); *G06Q 20/3676* (2013.01); *G06Q 20/3825* (2013.01); *G06Q 20/3829* (2013.01); *G06Q 20/38215* (2013.01); *G06Q 20/401* (2013.01); *G06Q 20/407* (2013.01); *G06Q 20/40975* (2013.01); *G07F 7/1008* (2013.01)

(56) References Cited

U.S. PATENT DOCUMENTS

| | | | |
|---|---|---|---|
| 5,264,689 A | 11/1993 | Maes et al. | |
| 5,694,471 A | 12/1997 | Chen et al. | |
| 5,773,804 A * | 6/1998 | Baik | G06Q 20/26 235/375 |
| 5,806,045 A | 9/1998 | Biorge et al. | |
| 5,952,639 A | 9/1999 | Ohki et al. | |
| 5,987,438 A * | 11/1999 | Nakano | G06K 7/0013 235/375 |
| 6,070,795 A | 6/2000 | Feiken | |
| 6,327,578 B1 | 12/2001 | Linehan | |
| 6,422,459 B1 * | 7/2002 | Kawan | G06Q 20/105 235/375 |
| 6,427,912 B1 | 8/2002 | Levasseur | |
| 6,467,685 B1 * | 10/2002 | Teicher | G06Q 20/06 235/379 |
| 6,539,364 B2 | 3/2003 | Moribatake et al. | |
| 6,789,166 B2 * | 9/2004 | Kamise | G06Q 20/3572 711/100 |
| 6,839,840 B1 | 1/2005 | Cooreman | |
| 6,913,193 B1 * | 7/2005 | Kawan | G06Q 20/341 235/380 |
| 7,686,218 B2 | 3/2010 | Silverstein et al. | |
| 7,721,955 B2 | 5/2010 | Harrison et al. | |
| 7,765,162 B2 | 7/2010 | Binder et al. | |
| 8,019,365 B2 * | 9/2011 | Fisher | G06Q 20/20 235/380 |
| 8,117,453 B2 | 2/2012 | Huque | |
| 8,190,087 B2 | 5/2012 | Fisher et al. | |
| 8,276,814 B1 * | 10/2012 | Davis | G06Q 20/352 235/375 |
| 8,290,433 B2 | 10/2012 | Fisher et al. | |
| 8,386,349 B2 | 2/2013 | Dixon et al. | |
| 8,401,964 B2 | 3/2013 | Radu et al. | |
| 8,571,988 B2 * | 10/2013 | Kusakabe | G06Q 20/105 235/379 |
| 8,805,746 B2 * | 8/2014 | Hoffman | G06Q 20/04 455/558 |
| 8,898,088 B2 | 11/2014 | Springer et al. | |
| 8,959,034 B2 | 2/2015 | Jiang et al. | |
| 9,020,858 B2 | 4/2015 | Jiang et al. | |
| 9,286,604 B2 | 3/2016 | Aabye et al. | |
| 2002/0133409 A1 | 9/2002 | Sawano et al. | |
| 2003/0097270 A1 | 5/2003 | Musselwhite et al. | |
| 2005/0091492 A1 * | 4/2005 | Benson | G06Q 20/02 713/170 |
| 2005/0218211 A1 * | 10/2005 | Saso | G06Q 20/04 235/380 |
| 2006/0018450 A1 | 1/2006 | Sandberg-Diment | |
| 2006/0047593 A1 | 3/2006 | Naratil et al. | |
| 2007/0150411 A1 | 6/2007 | Addepalli et al. | |
| 2007/0168260 A1 | 7/2007 | Cunescu et al. | |
| 2007/0192178 A1 | 8/2007 | Fung et al. | |
| 2007/0226135 A1 * | 9/2007 | Yamada | G06Q 20/10 705/39 |
| 2007/0266130 A1 * | 11/2007 | Mazur | G06Q 20/12 709/223 |
| 2007/0271193 A1 * | 11/2007 | Tan | G06Q 20/027 705/79 |
| 2007/0278291 A1 | 12/2007 | Rans et al. | |
| 2008/0059374 A1 | 3/2008 | Gangi | |
| 2008/0167120 A1 * | 7/2008 | Spyres | 463/25 |
| 2008/0208681 A1 | 8/2008 | Hammad et al. | |
| 2008/0223918 A1 | 9/2008 | Williams et al. | |
| 2009/0036166 A1 | 2/2009 | Yen et al. | |
| 2009/0143104 A1 | 6/2009 | Loh et al. | |
| 2009/0265260 A1 | 10/2009 | Aabye et al. | |
| 2009/0265271 A1 | 10/2009 | Aabye et al. | |
| 2010/0153267 A1 | 6/2010 | Ghaidan et al. | |
| 2010/0198728 A1 | 8/2010 | Aabye et al. | |
| 2010/0217710 A1 | 8/2010 | Fujita | |
| 2010/0312617 A1 | 12/2010 | Cowen | |
| 2010/0325269 A1 | 12/2010 | Kim et al. | |
| 2011/0106710 A1 * | 5/2011 | Reed | G06Q 20/20 705/71 |
| 2011/0226852 A1 | 9/2011 | Brennan | |
| 2011/0276420 A1 | 11/2011 | White et al. | |
| 2011/0298726 A1 * | 12/2011 | Wu | G06F 1/1632 345/173 |
| 2011/0302023 A1 | 12/2011 | Thye et al. | |
| 2012/0011062 A1 | 1/2012 | Baker et al. | |
| 2012/0158584 A1 * | 6/2012 | Behren | G06Q 20/10 705/41 |
| 2012/0159105 A1 | 6/2012 | von Behren et al. | |
| 2013/0024363 A1 | 1/2013 | Cunescu et al. | |
| 2013/0103523 A1 | 4/2013 | Okonkwo et al. | |
| 2013/0103524 A1 | 4/2013 | Springer et al. | |
| 2013/0159080 A1 * | 6/2013 | Wu | G06Q 30/02 705/14.23 |
| 2013/0185214 A1 | 7/2013 | Azen et al. | |
| 2013/0268582 A1 * | 10/2013 | Sitati | H04L 67/42 709/203 |
| 2013/0290090 A1 | 10/2013 | Bortolin et al. | |
| 2014/0046784 A1 | 2/2014 | Prakash et al. | |
| 2014/0100973 A1 | 4/2014 | Brown et al. | |
| 2015/0073953 A1 | 3/2015 | Springer et al. | |
| 2015/0134469 A1 * | 5/2015 | White | G06Q 20/105 705/17 |
| 2015/0278795 A1 | 10/2015 | Jiang et al. | |
| 2015/0278796 A1 | 10/2015 | Jiang et al. | |
| 2016/0042344 A1 | 2/2016 | Thimmana et al. | |
| 2016/0371716 A1 | 12/2016 | Aitenbichler et al. | |

FOREIGN PATENT DOCUMENTS

| | | |
|---|---|---|
| EP | 1 565 016 A3 | 8/2005 |
| EP | 1 783 623 A1 | 5/2007 |
| JP | 06259452 | 9/1994 |
| JP | H09-185658 A | 7/1997 |
| JP | 2002-216191 A | 8/2002 |
| JP | 2003-281234 A | 10/2003 |
| JP | 2004-355486 A | 12/2004 |
| JP | 2004-362332 A | 12/2004 |
| JP | 2006-259452 | 9/2006 |
| JP | 2007-241670 A | 9/2007 |
| JP | 2010-026811 A | 2/2010 |
| JP | 2013-186528 A | 9/2013 |
| JP | 2013-186529 A | 9/2013 |
| KR | 1020060016570 A1 | 8/2006 |
| KR | 10-2010-0138659 A | 12/2010 |
| KR | 10-2011-0004043 A | 1/2011 |
| WO | WO 1998/052151 A1 | 11/1998 |
| WO | WO 2001/09851 A1 | 2/2001 |
| WO | 2013/063166 A1 | 5/2013 |
| WO | 2013083960 A1 | 6/2013 |
| WO | 2013/106159 A1 | 7/2013 |
| WO | 2013109134 A1 | 7/2013 |
| WO | 2013/130912 A2 | 9/2013 |
| WO | 2014/164571 A1 | 10/2014 |
| WO | 2015/148850 A1 | 10/2015 |

(56) References Cited

FOREIGN PATENT DOCUMENTS

| WO | 2016/204927 A1 | 12/2016 |
|---|---|---|
| WO | 2016/204927 A8 | 1/2017 |

OTHER PUBLICATIONS

Author: Oh, E.G. Title: International Search Report and Written Opinion issued in International Application No. PCT/US2013/028466 pp. 1-24 dated Sep. 11, 2013.
U.S. Appl. No. 14/539,990 to Springer et al. filed Nov. 12, 2014.
Stopp, "Office Action issued in copending U.S. Appl. No. 13/280,209, filed Oct. 24, 2011", dated Feb. 23, 2015, 1-16.
Stopp, "Office Action issued in copending U.S. Appl. No. 13/280,209, filed Oct. 24, 2011", dated Jun. 3, 2015, 1-14.
U.S. Appl. No. 14/744,716 to Aitenbichler et al. filed Jun. 19, 2015.
Iluonakhamhe, "Office Action issued in copending U.S. Appl. No. 13/408,804, filed Feb. 29, 2012", dated Jul. 9, 2014, 1-13.
Kim, "International Search Report and Written Opinion issued in International Appl. No. PCT/US2014/022856", dated Jul. 24, 2014, 1-12.
Stopp, "Office Action issued in copending U.S. Appl. No. 13/280,209, filed Oct. 24, 2011", dated Jul. 31, 2014, 1-15.
Stopp, "Office Action issued in copending U.S. Appl. No. 13/280,231, filed Oct. 24, 2011", dated Aug. 5, 2014, 1-13.
Author: Bolton, H. Title: Australian Office Action issued in Application No. 2012244201 pp. 1-4 dated Dec. 13, 2012.
Author: Geedipally, A. Title: Australian Office Action issued in Application No. 2013202684 pp. 1-2 dated May 21, 2013.
Author: Ggedipally, A. Title: Australian Office Action issued in Application No. 2013205181 pp. 1-2 dated May 21, 2013.
Author: Park, J. H. Title: International Search Report and Written Opinion for International Patent Application No. PCT/US2012/061756 filed Oct. 24, 2012 pp. 1-10 dated Mar. 27, 2013.
Author: Bolton, H. Title: Australian Office Action issued in Application No. 2012244201 pp. 1-4 dated Dec. 16, 2013.
Author: Bolton, H. Title: Australian Office Action issued in Application No. 2012244201 pp. 1-3 dated Jul. 2, 2013.
Author: Iluonakhamhe, I. Title: Office Action issued in copending U.S. Appl. No. 13/408,813, filed Feb. 29, 2012 pp. 1-12 dated Jun. 9, 2014.
Author: Iluonakhamhe, I. Title: Office Action issued in copending U.S. Appl. No. 13/408,794, filed Feb. 29, 2012 pp. 1-18 dated Mar. 18, 2014.
U.S. Appl. No. 13/280,209 to Okonkwo et al. filed Oct. 24, 2011.
U.S. Appl. No. 13/280,231 to Springer et al. filed Oct. 24, 2011.
U.S. Appl. No. 13/408,794 to Springer et al. filed Feb. 29, 2012.
U.S. Appl. No. 13/408,804 to Jiang et al. filed Feb. 29, 2012.
U.S. Appl. No. 13/408,813 to Jiang et al. filed Feb. 29, 2012.
Raymaekers, "Extended European Search Report issued in European Application No. 15769698.0", dated Sep. 29, 2017, 15 pages.
Berthon, "International Search Report and Written Opinion issued in International Application No. PCT/US2016/033374", dated Jul. 28, 2016, 17 pages.
Keritsis, "U.S. Office Action issued in copending U.S. Appl. No. 14/226,785, filed Mar. 21, 2014", dated Oct. 5, 2016, 20 pages.
Wittmann-Regis, "International Preliminary Report on Patentability issued in International Application No. PCT/US2015/022831", dated Oct. 6, 2016, 11 pages.
Immanuel, "U.S. Office Action issued in copending U.S. Appl. No. 14/539,990, filed Nov. 12, 2014", dated Oct. 17, 2017, 15 pages.
Baharlou, "International Preliminary Report on Patentability issued in International Application No. PCT/US2013/028466", dated Sep. 12, 2014, 19 pages.
Liu, "U.S. Office Action issued in copending U.S. Appl. No. 14/226,798, filed Mar. 26, 2014", dated Dec. 16, 2015, 13 pages.
Mohri, "International Preliminary Report on Patentability issued in International Application No. PCT/US2012/061756", dated May 8, 2014, 7 pages.
Mohri, "International Preliminary Report on Patentability issued in International Application No. PCT/US2014/022856", dated Sep. 24, 2015, 9 pages.
Pahwa, "Office Action issued in Australian Application No. 2012244201", dated Jun. 17, 2014, 4 pages.
Park, "International Search Report and Written Opinion issued in International Application No. PCT/US2015/022831", dated Jul. 9, 2015, 14 pages.
Liu, "U.S. Office Action issued in copending U.S. Appl. No. 14/226,798, filed Mar. 26, 2014", dated Jun. 21, 2016, 24 pages.
Breugelmans, "Extended European Search Report issued in European Application No. 14778996.0", dated Oct. 11, 2016, 10 pages.
Brandenburg, "U.S. Office Action issued in copending U.S. Appl. No. 14/744,716, filed Jun. 19, 2015", dated Dec. 15, 2017, 25 Pages.
Ziaie, "Canada Office Action received for Canada Patent Application No. 2,943,810", dated Jun. 5, 2017, 4 pages.
Thong, "Australian Office Action issued in Australian Application No. 2015235940", dated Nov. 14, 2017, 4 pages.
Yamamoto, "Japanese Office Action issued in Japanese Application No. 2016-558629", dated Nov. 13, 2017, 04 pages of English Translation and 05 pages of Japanese Office Action.
Keritsis, "U.S. Office Action issued in copending U.S. Appl. No. 14/226,785, filed Mar. 26, 2014", dated Sep. 13, 2017, 21 pages.
Thong, "Australian Office Action issued in Australian Application No. 2015235940", dated Mar. 14, 2017, 5 pages.
Keritsis, "U.S. Office Action issued in copending U.S. Appl. No. 14/226,785, filed Mar. 26, 2014", dated Mar. 29, 2017, 16 pages.
Brandenburg, "U.S. Office Action issued in copending U.S. Appl. No. 14/744,716, filed Jun. 19, 2015", dated Aug. 21, 2017, 25 pages.
Yamamoto, "Japanese Office Action issued in Japanese Application No. 2016-558629", dated Jun. 25, 2018, 06 pages of English Translation and 05 pages of Japanese Office Action.
Ziaie, "Canada Office Action received for Canada Patent Application No. 2943810", dated Jun. 6, 2018, 3 pages.
Etienne, "International Preliminary Report on Patentability issued in International Application No. PCT/US2016/033374", dated Dec. 28, 2017, 13 pages.
"Chinese Office Action issued in Chinese Application No. 201480019496.5", dated Feb. 1, 2018, 10 pages of English Translation and 7 pages of Chinese Office Action.
Brandenburg, "U.S. Office Action issued in copending U.S. Appl. No. 14/744,716, filed Jun. 19, 2015", dated Jul. 23, 2018, 34 pages.
Keritsis, "U.S. Office Action issued in copending U.S. Appl. No. 14/226,785, filed Mar. 26, 2014", dated May 22, 2018, 12 pages.
Immanuel, "U.S. Office Action issued in copending U.S. Appl. No. 14/539,990, filed Nov. 12, 2014", dated Jun. 8, 2018, 19 pages.
Park, "Korean Office Action issued in Korean Application No. 10-2016-7029240", dated Apr. 19, 2018, 4 pages of English Translation and 4 pages of Korean Office Action.
"Chinese Office Action issued in Chinese Application No. 201480019496.5", dated Oct. 8, 2018, 10 pages of English Translation and 05 pages of Chinese Office Action.

* cited by examiner

PENDING DEPOSIT FOR PAYMENT PROCESSING SYSTEM

TECHNICAL FIELD

The present disclosure relates generally to near field communication (NFC) enabled smart cards, and more particularly to methods and systems for depositing funds onto NFC smart cards for use during the offline processing of purchases.

BACKGROUND

Near Field Communication (NFC) is a proximity communication technology that can enable merchant device payment technologies and that is supported by the Global System for Mobile Communications (GSM) Association. Radio frequency identification (RFID) is another wireless communication technology that can be adapted to enable NFC smart card payment technology. NFC communication generally is conducted in a range from about 3 to about 4 inches. Such short communication distances enable secure communication between close field proximity enabled devices. In operation of an NFC transaction, a user "taps" a device, such as an NFC-enabled mobile phone or NFC-enable smart card, to a reader. The reader recognizes the NFC-enabled device when the device is moved within range of the reader, establishes a secure communication channel with the device, and initiates a payment transaction between the reader and the device.

Smart cards are devices with an embedded integrated circuit (for example, a microprocessor and/or memory) to store data. Smart cards typically are credit card sized electronic devices that have a variety of uses and can be utilized in any transaction that involves the exchange of data or information. Smart card technology has been particularly useful in financial transaction systems. Smart cards generally do not include a data entry device for direct entry of data. Instead, a smart card is used in conjunction with a card reader and/or an input device. Traditionally, a smart card is linked to a financial account or contains financial account information. Consequently, when the smart card is used, the reader receives the financial account information and conducts a debit transaction from the financial account, requiring network access to process the on-line transaction. Such conventional smart cards are inoperable when access to a network or to specific computers on the network is not available.

SUMMARY

In certain example aspects, a method for depositing funds onto NFC smart cards for use during the offline processing of purchases can include a merchant device that facilitates automatic, convenient, and secure communications with a smart card. The user taps the smart card in the merchant device's radio frequency field. The merchant device and the smart card establish a secure communication channel. Once a secure communication channel is established, the smart card transmits its card identification information, which comprises the card account number and the card verification number, and the transaction history to the merchant device. The merchant device may transmit this information to the remote system to confirm the identity of the smart card and analyze the transactions.

The user may deposit funds onto the smart card using the merchant device, wherein a merchant operating the merchant device enters the deposit information onto the merchant device, creates a deposit request, signs the deposit request using an access key, and transmits a request to the remote system. The transmitted request comprises the card identification information, the access key signature, and the amount of the deposit. The remote system confirms the identity of the smart card, processes the request, certifies the request using a signing key, and transmits a deposit record to the merchant device, which in turn transmits the deposit record to the smart card. If the merchant device has network access, the merchant device transmits a confirmation that the deposit record was written to the smart card to the remote system. The remote system receives the deposit confirmation and updates the smart card account to include the deposit confirmation. If the merchant device does not have network access, or if the merchant device is otherwise not able to maintain a secure connection with the remote system, the deposit confirmation is transmitted to the remote system when the smart card is involved in a future transaction (for example, when the user deposits additional funds onto the smart card or when the user withdrawals funds from the smart card).

When the smart card is used in a future transaction, the merchant device confirms the identity of the smart card, and the smart card transmits the transaction history to the merchant device. The merchant device transmits the smart card's transaction history, which comprises the deposit confirmation, to the remote system. When the transaction records, together with the appropriate signatures and deposit confirmation, are transmitted to the remote system, the remote system verifies the signature to ensure the transaction records uploaded are genuine and certifies the record using a signing key. The remote system reviews the deposit confirmation and updates the smart card account to include the deposit confirmation.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
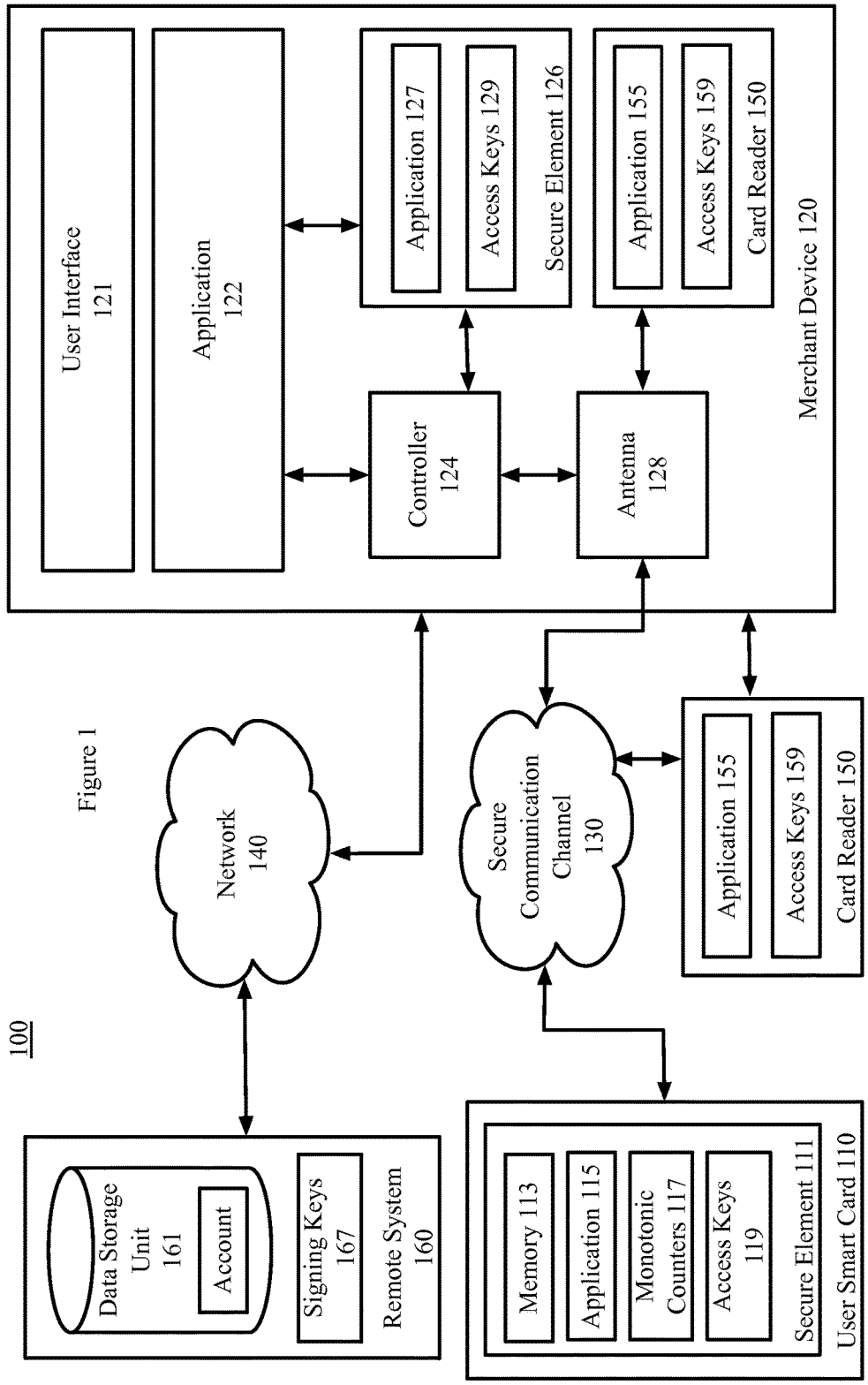
FIG. 1 is a block diagram depicting an offline purchase processing system, in accordance with certain example embodiments.

The example embodiments described herein provide computer-implemented techniques for enabling users to deposit funds onto NFC smart cards for use during the offline processing of purchases with a merchant device/card reader.

The user taps the smart card in the radio frequency field of the merchant device. The merchant device and the smart card establish a secure communication channel, and the smart card transmits its card identification information to the merchant device. The card identification information can comprise the card account number and the card verification number. If the merchant device has network access, the card identification information is transmitted to a remote payment processing system for card verification by cross-referencing the card account number and the card verification number. If the merchant device is without network access, the merchant device verifies the identity of the smart card.

If the smart card is new or inactive, the merchant device is prompted to register and activate the card. The activation of a new smart card occurs only when the merchant device has network access. The user may be prompted to create a new remote system account or to associate the smart card with an existing remote system account. Alternatively, the smart card may be activated without a remote system account. The remote system generates a random card verification number that becomes associated with the smart card and encoded in the card identification information. The remote system transmits the initial smart card data to the merchant device, which includes the card verification number, and the merchant device transmits the data to the smart card.

The user may deposit funds onto the smart card using the merchant device. The smart card transmits the transaction history to the merchant device, which in turn transmits the transaction history to the remote system for storage in the card account. The remote system and/or merchant device may confirm the identity of the smart card by cross-referencing the card account number and the card verification number. In an example online transaction, every deposit record is signed by the remote system using an asymmetric signing key before transmitting the record to the merchant device. A private key (for example, a teller signing key) is maintained by the remote system and a public key (for example, a teller access key) is transmitted to the merchant device. Therefore, a merchant device containing the public key can verify the authenticity of an online transaction record stored on the smart card using the public key, but it cannot manipulate an existing transaction record or issue a new deposit record without connecting to the server. A merchant operating the merchant device enters deposit information onto the merchant device, based on funds provided by a user of the smart card to the merchant. The merchant device creates and signs a deposit request with the teller access key, which is transmitted to the remote system. The remote system processes the request, verifies the identity of the smart card using the card verification number, certifies the deposit using the teller signing key, and calculates a new sum of deposits. The remote system then transmits a deposit record to the merchant device. The merchant device transmits the deposit record to the smart card, and the secure communication channel between the smart card and the merchant device is then terminated.

If the merchant device has network access, the merchant device transmits a confirmation that the deposit record was written to the smart card to the remote system. The remote system receives the deposit confirmation and updates the smart card account to include the deposit confirmation. If the merchant device does not have network access, or if the merchant device is otherwise not able to maintain a secure connection with the remote system, the deposit confirmation is transmitted to the remote system when the smart card is involved in a future transaction (for example, when the user deposits additional funds onto the smart card or when the user withdrawals funds from the smart card). When the smart card is used in a future transaction, the merchant device confirms the identity of the smart card and the smart card transmits the transaction history to the merchant device. The merchant device transmits the smart card's transaction history, which comprises the deposit confirmation, to the remote system. When the transaction records, together with the appropriate signatures and deposit confirmation, are transmitted to the remote system, the remote system verifies the signature to ensure the transaction records uploaded are genuine and certifies the record using a signing key. The remote system reviews the deposit confirmation and updates the smart card account to include the deposit confirmation.

Turning now to the drawings, in which like numerals represent like (but not necessarily identical) elements throughout the figures, example embodiments are described in detail.

Example System Architectures

FIG. 1 is a block diagram depicting a system 100 for processing an offline purchase initiated by a tap of a smart card 110 with a merchant device 120, comprising a card reader 150, according to an example embodiment. As depicted in FIG. 1, the example operating environment 100 includes a merchant device 120 and a user smart card 110 that are configured to communicate with one another via one or more secure communication channels 130. The example operating environment 100 also includes a remote computer system 160 that is configured to communicate with the merchant device 120 via one or more networks 140.

In example embodiments, the secure communication channel 130 can comprise communication via a close proximity communication protocol, such as near field communication (NFC), Bluetooth, or Wi-Fi, using appropriate protocols corresponding to those communication methods. In an alternative example embodiment, the secure communication channel 130 can comprise a cellular network.

In an example embodiment, NFC communication protocols include, but are not limited to ISO/IEC 14443 type A and/or B technology (hereafter "ISO 14443"), MIFARE technology (hereafter "MIFARE"), and/or ISO/IEC 18092 technology (hereafter "ISO 18092"). ISO 14443 is a communication protocol for merchant devices operating in close proximity with a reader. An ISO 14443 communication protocol is utilized for secure card payments, including but not limited to credit card payments, debit card payments, and other forms of financial card payments. MIFARE is a communication protocol for merchant devices that comply with proprietary device standards that are based on ISO 14443. A MIFARE protocol is utilized for stored function transactions, including but not limited to gift cards, transit cards, tickets, access cards, loyalty cards, and other forms of stored value card transactions. A MIFARE protocol may also be used for limited value-added services. ISO 18092 is a communication protocol for merchant devices operating at higher bit rates, allowing for richer communication between the devices. An ISO 18092 communication protocol is utilized for peer-to-peer communication, value-added services (including, but not limited to, coupons, loyalty cards, check-ins, membership cards, gift cards, and other forms of value-added services), and other forms of richer communication. Any suitable NFC communication protocol can be used for NFC communication between the smart card 110 and the merchant device 120 to implement the methods and functionality described herein.

In an example embodiment, the merchant device system 120 can refer to a smart device that can communicate via an electronic, magnetic, or radio frequency field between the device 120 and another device, such as a smart card 110. In an example embodiment, the merchant device 120 has processing capabilities, such as storage capacity/memory and one or more applications 122 that can perform a particular function. In an example embodiment, the merchant device 120 contains an operating system (not illustrated) and user interface 121. Example merchant devices 120 include smart phones; mobile phones; personal digital assistants (PDAs); mobile computing devices, such as netbooks, tablets, and iPads; laptops; and other devices, in each case having processing and user interface functionality.

The merchant device 120 also comprises a secure element 126, which can exist within a removable smart chip or a secure digital (SD) card or which can be embedded within a fixed chip on the device 120. In certain example embodiments, Subscribed Identity Module (SIM) cards may be capable of hosting a secure element 126, for example, an NFC SIM Card. The secure element 126 allows a software application 122 resident on the device 120 and accessible by the device user to interact securely with certain functions within the secure element 126, while protecting information stored within the secure element. The secure element 126 comprises applications 127 running thereon that perform the functionality described herein.

The merchant device system 120 also comprises one or more access keys 129. In an example embodiment, the access keys 159 may be defined as online transaction keys or offline transactions keys. An example online transaction key is an asymmetric key, wherein the private key is stored on the remote system 160 and the private key is transmitted to the merchant device 120. In an alternative example embodiment, the online transaction key may be a symmetric key. An example offline transaction key is a symmetric key used to sign offline transactions. In an alternative example embodiment, the offline transaction key is an asymmetric key. An offline transaction key is generated by the remote system 160 and transmitted to the merchant device 120 for each new session. Each session key can be used only by one merchant device 120 for the duration of a single session (for example, for the period of time from when the merchant signs onto a new session until the merchant signs out of the session). In addition, each session key may have a maximum number of transactions allowed per session key or a maximum time period allowed per session key. The session key may become invalid if the maximum is reached and the merchant may be required to start a new session, and thus receive a new session key.

Each session key is specifically provided by the remote system 160 for the type of session designated by the merchant (for example, for depositing funds or withdrawing funds onto a smart card 110). The method of transmitting an access key 129 to a smart card 110 is described in more detail hereinafter with reference to the methods described in FIG. 9. In an example embodiment, the access key 159 is stored in the secure element 126 during the operation of the session. At the completion of each session, the access key 159 is wiped from the memory of the merchant device system 120.

An example access key 159 is designated as a teller access key or a cashier access key. An example teller access key is transmitted to the merchant device system 120 to assist in depositing funds onto a smart card 110. The teller access key will allow the merchant to read or write deposit transaction and to read withdrawal transactions. An example cashier access key is transmitted to the merchant device system 120 to assist in withdrawing funds from a smart card 110. The cashier access key will allow the merchant to read deposit transaction and to read and write withdrawal transactions. In an example embodiment, the access keys 159 are specific to each merchant session with the merchant device system 120 and are not readable, known or otherwise accessible to other merchant devices. Without an access key 159, the merchant device 120 cannot read or write transaction records onto the smart card 110. In an example embodiment, the access keys 159 will define levels of access/permission to read and write data to the smart card 110.

In an example embodiment, the merchant device 120 transmits a deposit or withdrawal record signed by the access key 159 residing on the merchant device 120 to the smart card 110. For example, during a deposit transaction, the merchant device 120 transmits a deposit record signed by the teller access key to the smart card 110 and during a withdrawal transaction, the merchant device 120 transmits a withdrawal record signed by the cashier access key to the smart card 110. In an example embodiment, the remote system 160 maintains a record of which access key 159 is transmitted to every merchant device system 120. Therefore, the remote system 160 is capable of determining which merchant device 120 signed each transaction and during which session the transaction was signed based upon the deposit/withdrawal records stored in the transaction history on the smart card 110. An example access key 119 can be used to read and confirm that the remote system 160 has certified or verified a deposit or withdrawal.

The secure element 126 includes components typical of a smart card, such as crypto processors and random generators. In an example embodiment, the secure element 126 comprises a Smart MX type NFC controller 124 in a highly secure system on a chip controlled by a smart card operating system, such as a JavaCard Open Platform (JCOP) operating system. In another example embodiment, the secure element 126 is configured to include a non-EMV type merchant smart card, as an optional implementation.

The secure element 126 communicates with the controller 124 and the application 122 in the merchant device 120. In an example embodiment, the secure element 126 is capable of storing encrypted user information and only allowing trusted applications to access the stored information. The controller 124 interacts with a secure key encrypted application 122 for decryption and installation in the secure element 126.

In an example embodiment, the controller 124 is a Bluetooth link controller. The Bluetooth link controller may be capable of sending and receiving data, identifying the smart card 110, performing authentication and ciphering functions, and directing how the merchant device 120 will listen for transmissions from the smart card 110 or configure the merchant device 120 into various power-save modes according to the Bluetooth-specified procedures. In another example embodiment, the controller 124 is a Wi-Fi controller or an NFC controller capable of performing similar functions.

The application 122 is a program, function, routine, applet or similar entity that exists on and performs its operations on a merchant device 120. For example, the application 122 may be one or more of an offline payment application, a digital wallet application, a coupon application, a loyalty card application, another value-added application, a user interface application, or other suitable application operating on the merchant device 120. Additionally, the secure element 126 also may comprise secure merchant software applications, such as an offline payment or other payment applications, secure forms of the applications 122, authentication applications, payment provisioning applications, or other suitable application using the secure functionality of the secure element.

The merchant device 120 communicates with the smart card 110 via an antenna 128. In an example embodiment, once the merchant device application 122 has been activated and prioritized, the controller 124 is notified of the state of readiness of the merchant device 120 for a transaction. The controller 124 outputs through the antenna 128 a radio signal, or listens for radio signals from the smart card 110. On establishing a secure communication channel between the merchant device 120 and the smart card 110, the merchant device 120 may request a list of applications 115 available from the smart card 110. A directory is first displayed, after which, based on the set priority or the type of smart card 110, an application 115 and 122 are chosen and initiated for the transaction.

An example smart card 110 can refer to a smart device that can communicate via an electronic, magnetic or radio frequency field between the card 110 and another device, such as a merchant device 120 or a card reader 150. In an example embodiment, the smart card 110 has processing capabilities, such as storage capacity/memory 113 and one or more applications 115 that can perform a particular function. In an example embodiment, the smart card also has an NFC enabled chip (not illustrated) implemented, either independently or on existing components, within the smart card 110. Example smart cards 110 may include MIFARE cards, stored value memory cards, and other types of memory cards.

In an example embodiment, the memory 113 and application 115 may be implemented in a secure element, as described previously, on the smart card 110. The smart card 110 also may contain one or more access keys 119 that control access to the information contained in the memory 113. For example, security measures can include password keys and logic that are hard-coded into the smart card 110 by the manufacturer. In an example embodiment, the access keys 119 contained on the smart card 110 are also used for mutual authentication between the smart card 110 and the merchant device 120. For example, a smart card which does not comprise a correct access key 119 will not be authenticated by the merchant device 120. As a result, the transaction will be rejected. In an example embodiment, the smart card 110 contains one or more of a cashier key, a teller key, and a mint key. As described above, a cashier access key is used to change the value of the smart card 110 by withdrawing funds and a teller access key is used to put value onto the smart card 110 by depositing funds. An example mint key is used to change any of the existing keys resident on the smart card 110. In an example embodiment, the mint key is used to setup the keys, reset the card data and reset the counters. In an example embodiment, the teller and cashier keys may be rotated. For example, the keys may be rotated based on a defined time period, data capacity, or other defined basis for rotation. The mint key may define the basis for rotating the access keys 119. In an example embodiment, the access keys 119 will define levels of access/permission to read and write data to the smart card 110.

In an alternative example embodiment, a symmetric key may be utilized to encrypt the data on the smart card 110, so that an NFC-enabled device without such a key cannot comprehend the data on the smart card 110. The key is shared with the remote system 160, the merchant device 120, and the card reader 150.

In an example embodiment, a monotonic counter 117 may also be implemented in a secure element on the smart card 110. Counters may store the number of times a particular event or process has occurred. An example counter is monotonic and thus, only allows for the values to be increased or incremented, not decreased. This preventative measure prevents users from saving the current state of a smart card 110, using the card and then rolling the card back to the previously saved state, thereby receiving a free transaction. An example embodiment, a sum of deposits and a sum of withdrawals are stored in the monotonic counter 117. The sum of deposits and sum of withdrawals can be compared to the saved transaction history on the smart card 110 when a transaction is requested. Because the sum of deposit and/or sum of withdrawals are store in the monotonic counter (which can only be incremented, not decreased), a smart card 110 that has been rolled back to a previous state can be detected and inactivated. The method of determining the sum of withdrawals and sum of deposits is described in more detail hereinafter with reference to the methods described in FIGS. 2-10.

In an alternative example embodiment, a monotonic counter 117 is increased during each withdrawal transaction and the total number of withdrawal transactions saved in the transaction history is compared to the number designated by the monotonic counter 117. Likewise, a monotonic counter 117 may be increased during each deposit transaction and the total number of deposit transactions saved in the transaction history is compared to the number designated by the monotonic counter 117.

As depicted in FIG. 1, the card reader 150 may be a component of the merchant device 120. For example, in an example embodiment, the card reader 150 is a merchant device application 122, wherein information exchanged with the smart card 110 via the secure communication channel 130 and antenna 128 is processed via the application 122.

In an alternative example embodiment, the card reader 150 may be a separate standalone device that communicates with the smart card 110 via one or more secure communication channels 130 and with the merchant device 120. As a standalone device, the card reader 150 can refer to a device that can communicate via an electronic, magnetic, or radio frequency field between the card reader 150 and another device, such as the smart card 110 and/or the merchant device 120. In this embodiment, the card reader 150 passes information between the smart card 110 and the merchant device 120. Additionally, when implementing this embodiment, the merchant device 120 may be a computer that does not have merchant NFC functionality, such as a desktop computer, server computer, laptop computer, mobile computing device (such as a mobile telephone, tablet computer, or smart phone), or other non-NFC enabled device.

In an example embodiment, the card reader 150 has processing capabilities, such as storage capacity/memory and one or more applications 155 that can perform a particular function. In an example embodiment, the card reader 150 contains an operating system (not illustrated) and user interface (not illustrated).

The card reader 150 is communicatively coupled to the merchant device 120 via a direct connection, via one or more secure communication channels 130, or via a network 140 (connection not illustrated). An example card reader 150 may contain an access key, as described above.

As further depicted in FIG. 1, the merchant device 120 may be communicatively coupled to the remote system 160 via a network 140. In an alternative example embodiment, the card reader 150 is also communicatively coupled to the remote system 160 via a network 140. The network 140 comprises a telecommunication means by which network devices (including devices 120, 150, and 160) can exchange data. For example, the network 140 can be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, a mobile telephone network, the Internet, Bluetooth, NFC or any other appropriate architecture or system that facilitates the communication of signals, data and/or messages (generally referred to as data).

According to an example embodiment, the merchant device 120 may connect to network 140 via a wired connection. For example, the connection may be a wired universal serial bus (USB) or Ethernet connection. In an alternative example embodiment, the merchant device 120 may connect to the network via a wireless connection. For example, the connection may be a Wi-Fi or Bluetooth connection to a hotspot that has a wired/wireless Internet connection (for example, MiFi), or any other wired or wireless connection suitable for communicating signals with network 140. In an alternative example embodiment, the connection may be a cellular network connection.

The example remote system 160 enables storage of smart card 110 account information. In an example embodiment, the user (not illustrated) creates a user account with the remote system 160 and registers a smart card 110. The remote system stores the smart card 110 data, including a history of all the card transactions, for example, each deposit of funds and each withdrawal of funds, for each account in the data storage unit 161. In an example embodiment, the remote system 160 analyzes the transaction history to identify missing data or possible errors.

In an example embodiment, one or more signing keys 167 are utilized to authenticate and certify data by the remote system 160. For example, the signing keys 167 may be symmetric or asymmetric keys. In an example embodiment, the signing keys 167 exist only on the remote system 160 and are not readable or otherwise accessible by the merchant device 120, smart card 110 or card reader 150. An example signing key 167 is designated as a teller signing key or a cashier signing key. An example teller signing key is used to authenticate and certify a depositing funds onto a smart card 110. An example cashier signing key is used to authenticate and certify a withdrawal of funds from a smart card 110. In an example embodiment, each deposit and each withdrawal transaction is certified by a signing key 167 resident on the remote system 160. Whenever a merchant reads a smart card 110, it may verify that the transaction records stored on the card are certified by a valid signing key 167. In an example embodiment, the signing keys 167 authorize and certify the transaction records with a digital signature signed by an asymmetric key. In an alternative example embodiment, the signing keys 167 authorize and certify the transaction records with a message authorization code (MAC) signed by a symmetric key.

In an example offline transaction, every withdrawal record is signed by a cashier session key 167. A session begins when a merchant signs into the merchant device 120 and ends when the merchant signs out. Each session may be associated with a quota, such as a maximum number of transactions, a maximum time period, or a maximum number of dollars. When the quota is reached, the merchant is required to connect to the remote system 160 and request a new session access key 129/159. A cashier access key 129/159 may be a symmetric key, which is derived from a master key using a session identification number. The master key is maintained by the remote system 160 and the cashier access key 129/159 is transmitted to the merchant device 120 when a new session is begun. The user also may withdraw funds from the smart card 110 using the merchant device 120. The smart card 110 transmits the card identification information and transaction history to the merchant device 120. The merchant device 120 confirms the identity of the smart card 110 by cross-referencing the card account number and the card verification number. The merchant confirms whether the smart card 110 has a sufficient balance available for a purchase transaction by using the merchant device 120 to read the current sum of deposits and the current sum of withdrawals from the monotonic counters 117 resident on the smart card 110. The merchant device 120 compares the sums read from the monotonic counters 110 to the sums calculated using the transaction history. If these numbers match, the merchant device 120 then calculates the smart card balance by subtracting the sum of withdrawals from the sum of deposits. If the balance is a number greater than or equal to the current transaction cost, the transaction is authorized. If sufficient balance is available, the merchant device 120 processes a debit transaction to debit the current transaction cost from the current sum of withdrawals. The merchant device 120 creates a withdrawal record and then uses the cashier access key 129/159 to sign the record. The merchant device 120 writes the signed withdrawal record to the smart card 110 and maintains a copy of the signed record for later transmission to the remote system 160. When the transaction records, together with the appropriate signatures, are later transmitted to the remote system 160, the remote system 160 verifies the signature to ensure the transaction records uploaded are genuine and certifies the record using the cashier signing key 167. The remote system 160 may also calculate the sum of all the transactions transmitted to verify that the quota is not exceeded or synchronize the transactions to identify missing records or errors. The methods of certifying a transaction are described in more detail hereinafter with reference to the methods described in FIG. 2-10.

Throughout this specification, it should be understood that the terms "data" and "information" are used interchangeably herein to refer to text, images, audio, video, or any other form of information that can exist in a computer-based environment.

Example System Processes

The components of the example operating environment 100 are described hereinafter with reference to the example methods illustrated in FIGS. 2-10.

Figure 2:
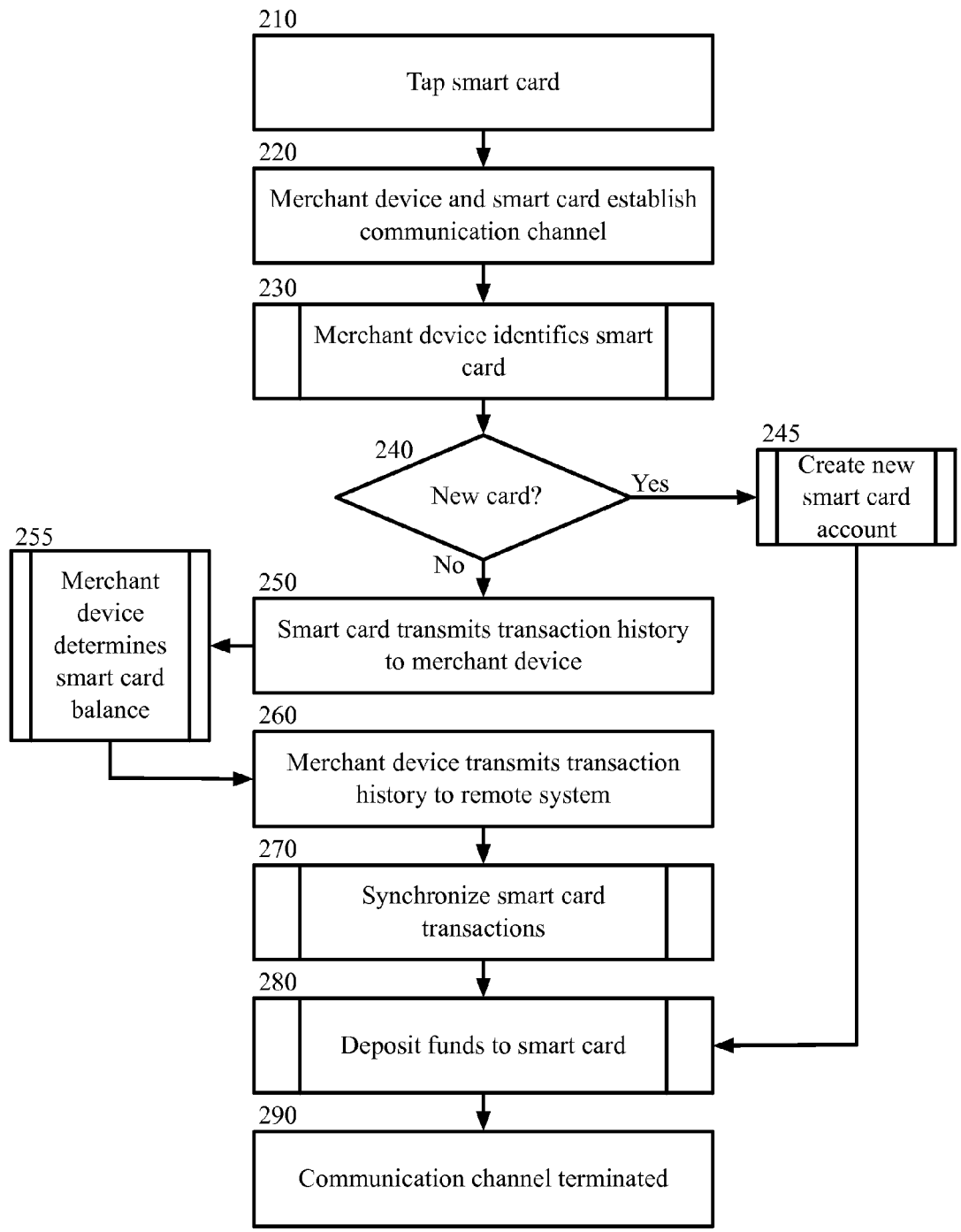
FIG. 2 is a block flow diagram depicting a method for processing a deposit of funds, in accordance with certain example embodiments.

FIG. 2 is a block flow diagram depicting a method for processing a deposit of funds to a smart card 110 via a merchant device 120, in accordance with certain example embodiments. The method 200 is described with reference to the components illustrated in FIG. 1.

In an example embodiment, a deposit transaction must be authorized by the remote system 160 and certified by the cashier signing key 167 before being written to the smart card 110. Once written, the merchant device 120 transmits confirmation to the remote system 160. The merchant device 120 has network 140 access, to provide for such authorization, certification, and transmittal of the confirmation. In an alternative example embodiment, the merchant device 120 is unable to maintain network 140 access to transmit confirmation to the remote system 160.

In block 210, the user "taps" the smart card 110 in the proximity of the merchant device 120. In an example embodiment, the merchant device 120 generates a radio frequency (RF) or other field polling for the presence of a smart card 110, and the user "taps" the smart card 110 by placing the card 110 within the field of the merchant device 120—in such embodiment, physical contact of the smart card 110 and the merchant device 120 might not occur. In an alternative example embodiment, the merchant activates the RF field or other field to poll for the presence of a smart card 110 using an application 122 on the merchant device 120. In certain example embodiments, the systems and methods described in FIGS. 2-10 herein are performed while the smart card 110 is tapped.

In block 220, the merchant device 120 detects the smart card 110 and establishes a secure communication channel 130. In an example embodiment, the secure communication channel 130 is an NFC communication channel.

In block 230, the merchant device 120 identifies the smart card 110. The method of identifying the smart card 110 is described in more detail hereinafter with reference to the methods described in FIG. 8.

Figure 5A:
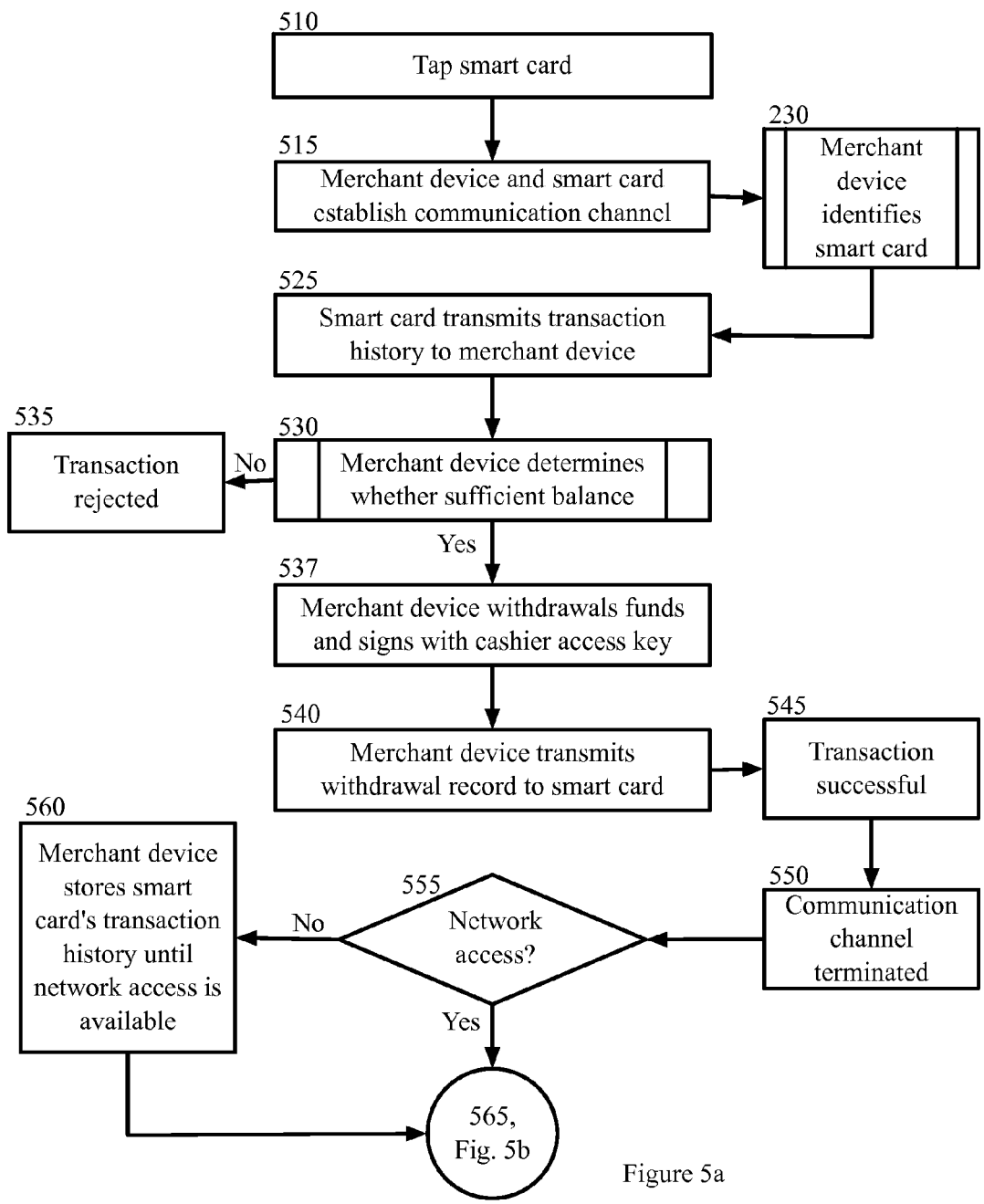
FIG. 5a is a block flow diagram depicting a method for processing a withdrawal of funds, in accordance with certain example embodiments.
Figure 5B:
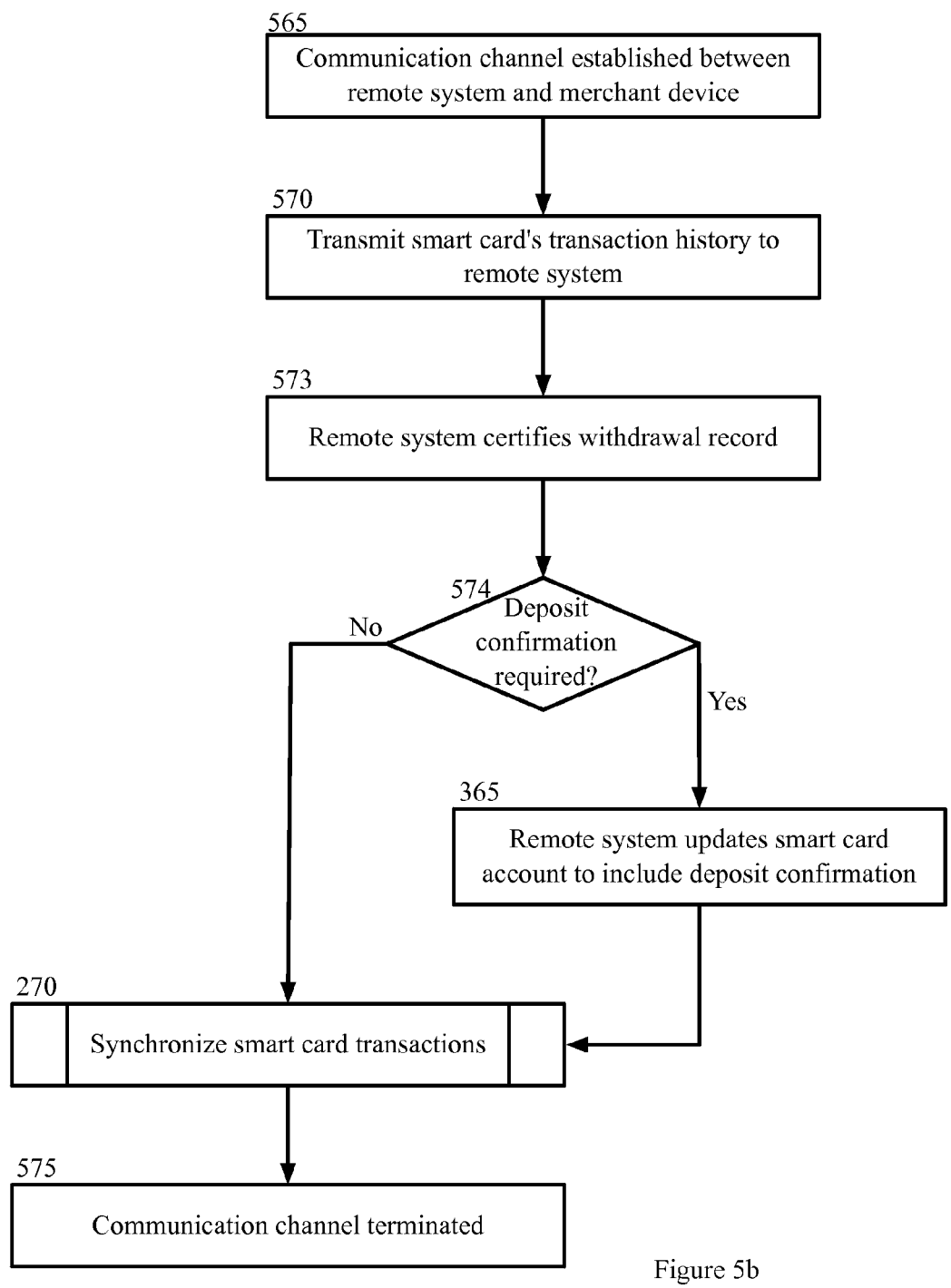
FIG. 5b is a block flow diagram depicting a method for processing a withdrawal of funds, in accordance with certain example embodiments.
Figure 8:
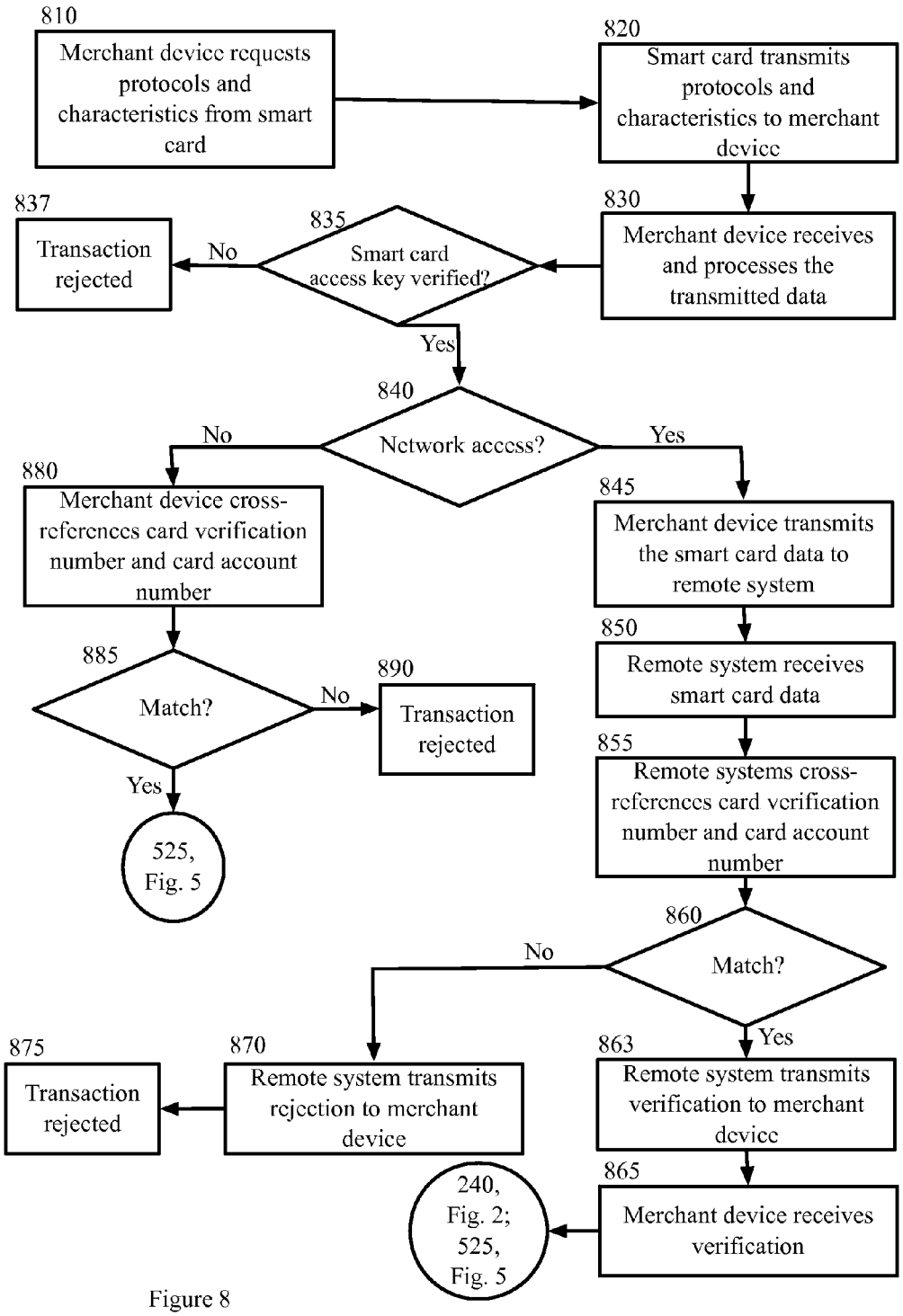
FIG. 8 is a block flow diagram depicting a method for identifying a smart card, in accordance with certain example embodiments.

FIG. 8 is a block flow diagram depicting a method for identifying the smart card 110, in accordance with certain example embodiments, as referenced in block 230 of FIGS. 2 and 5. The method 230 is described with reference to the components illustrated in FIG. 1.

In block 810, the merchant device 120 requests protocols and characteristics from the smart card 110. For example, the merchant device 120 may request the identification of communication protocols (for instance ISO/IEC 14443, MIFARE, and/or ISO/IEC 18092), a list of applications 115 available, card identification information (for instance a card number), and security protocols from the smart card 110. In an example embodiment, the merchant device 120 also requests the card verification number. In an example embodiment, the merchant device 120 may request verification of the access keys 119 contained on the smart card 110 for mutual authentication between the smart card 110 and the merchant device 120.

In block 820, the smart card 110 transmits the requested protocols and characteristics to the merchant device 120. In an example embodiment, the card verification number is encoded and stored in the memory 113 of the smart card 110 and not visible or otherwise written on the physical card. The requested information is extracted and transmitted to the merchant device 120 via the secure communication channel 130. In an alternative example embodiment, the smart card 110 is swiped in block 220. In this embodiment, the card account number and the card verification are encoded in the data stored in the magnetic stripe of the card and read by the merchant device 120.

In an example embodiment, the data may include the sum of deposits and/or the sum of withdrawal information. In an example embodiment, the merchant device 120 is capable of reading the data contained in the monotonic counters 117. In an example embodiment, the merchant device 120 uses this data to determine the smart card 110 balance. The method of determining the smart card 110 balance is described in more detail hereinafter with reference to the methods described in FIG. 10.

In block 830, the merchant device 120 receives and processes the protocols and characteristics transmitted by the smart card 110. In an example embodiment, the data encoding the card verification number may be decoded by the remote system 160. In this example embodiment, the merchant device 120 receives the data encoding the card verification number, without reading or decoding the data, and communicates it to the remote system 160 for verification. In an alternative example embodiment, the merchant device 120 may also be capable of decoding the card verification number and confirming the identity of the smart card 110.

In an alternative example embodiment, the merchant device 120 reads the information (including the protocols, characteristics and data encoding the card verification number) directly from the smart card 110.

In block 835, the merchant device 120 verifies the smart card 110 access key 119 and the smart card 110 verifies the merchant device 120 access key 129. In an example embodiment, the merchant device 120 verifies the smart card 110 access key 119 with the session access key 129 resident on the merchant device 120. The smart card 110 generates a number and transmits the number to the merchant device 120. The merchant device 120 decrypts the number using the session access key 129 and transmits the decrypted number back to the smart card 110. In an example embodiment, the smart card 110 verifies the merchant device 120 session access key 129 with the access key 119 resident on the smart card 110. The merchant device 120 generates a number and transmits the number to the smart card 110. The smart card 110 decrypts the number using the access key 119 and transmits the decrypted number back to the smart card 110. If the number decrypted by the smart card 110 and the number decrypted by the merchant device 120 match, the smart card and merchant devices are verified. In an example embodiment, this verification indicates that the smart card 110 and merchant device 120 have the correct permissions.

If the access keys 119 and 129 are not verified, the transaction is rejected, in block 837 and the method ends.

If the access keys 119 and 129 are verified, the method 230 continues to block 840.

In block 840, the merchant device 120 determines whether it has network 140 access. For example, if the merchant device 120 has network 140 access, the method 230 may occur while the merchant device 120 is connected to the remote system 160 and the smart card 110 data may be transmitted to the remote system 160. However, if the merchant device 120 does not have network 140 access and the transaction is occurring offline, the merchant device 120 may proceed with the transaction without transmitting the smart card 110 data to the remote system 160.

If the merchant device 120 has network 140 access, the merchant device 120 transmits the smart card 110 data to the remote system 160, in block 845. In an example embodiment, the merchant device 120 will have network 140 access for every deposit transaction. In an example embodiment, the merchant device 120 has network access and the smart card data is automatically transmitted to the remote system 160 upon receipt by the merchant device 120. In an alternative example embodiment, the operator of the merchant device 120 initiates the transmission of the smart card data to the remote system 160. In an example embodiment, the smart card data comprises the card account number and the card verification number.

In block 850, the remote system 160 receives the smart card data from the merchant device. In an example embodiment, the remote system 160 maintains a database of all smart cards and an account for each smart card 110. Each account for a particular smart card 110 can comprise one or more of information maintained on the smart card 110, user registration information, transaction history, and other information for maintaining the smart card 110. The remote system 160 can store each account record in the database 161. The card account information and the card verification number are among the data communicated from the merchant device 120 to the remote system 160 and stored in the account.

In block 855, the remote system 160 cross-references the card verification number and the card account number. In an example embodiment, the remote system 160 accesses the database of all smart cards and cross-references the numbers. In an alternative example embodiment, the remote system 160 accesses the smart card 110 account using the card account number and looks up the card verification number. In an example embodiment, the remote system 160 is capable of confirming the identity of the smart card from the data transmitted. The remote system 160 cross-references the card account number and the card verification number. In an example embodiment, the card verification number is a 32-bit number specific to the card account number. The card verification number may be a randomly generated number written into the card data when the smart card 110 was created. The card verification number may or may not be a number unique to a single card. For example, more than one smart card may have same card verification number. However, each smart card 110 has only one card verification number and the correct card verification number must be submitted with the matching card account number to confirm a valid transaction.

In an example embodiment, a new or inactivated smart card 110 may not contain a card verification number. The lack of a verification number may indicate to the remote system 160 that the smart card needs to be activated and the remote system 160 may transmit a message to the merchant device 120.

In block 860, the remote system 160 determines if the card verification number and card account number belong to the same card, thus confirming the identity of the smart card 110.

If, in block 860, the numbers are a match, the remote system 160 transmits verification of the identity of the smart card 110 to the merchant device, in block 863.

In block 865, the merchant device 120 receives the verification from the remote system 160.

From block 865, the method 230 proceeds to block 240 in FIG. 2, block 525 in FIG. 5, or as appropriate.

Returning to block 860 in FIG. 8, if the card verification number and card account number do not belong to the same smart card 110, the identity of the smart card 110 is not verified and the method 230 proceeds to block 870.

In block 870, the remote system 160 transmits a rejection message to the merchant device 120 indicating that the identity of the smart card 110 could not be verified.

In block 875, the merchant device 120 receives the message from the remote system 160. The merchant device 120 rejects the smart card 110 transaction and the secure communication channel 130 is terminated.

Returning to block 840 in FIG. 8, if the merchant device 120 does not have network 140 access, merchant device 120 may read the card identification information, including the card account number and card verification number, in block 880. The merchant device 120 may perform the smart card 110 verification without transmitting the data to the remote system 160 in block 845. In an example embodiment, the remote system 160 periodically communicates current smart card 110 information to the merchant device 120. Example smart card 110 information comprises smart card account numbers and corresponding card verification numbers. In an example embodiment, the smart card 110 information is stored by the merchant device 120. In an alternative example embodiment, the smart card 110 information is transmitted in the session access key 129 transmitted by the remote system 160 to the merchant device 120 at the beginning of each new session. In an example embodiment, during an offline transaction, the merchant device 120 can cross-reference the smart card 110 account number and verification number from the information transmitted by the remote system 160 without network 140 access to the remote system 160.

In block 885, the merchant device 120 determines if the card verification number and the card account number are a valid match. In an example embodiment, when a withdrawal transaction is performed without network 140 access, the merchant device 120 may confirm the identity of the smart card 110 during the transaction process, as described in FIG. 5. In an example embodiment, the merchant device 120 will confirm that a valid card verification number is encoded by the smart card 110 without accessing the remote system 160 database. A valid card verification number may comprise any number that fulfills the perimeters designated by the remote system 160. For example, the card verification number may be any 32-bit number that is encoded by the smart card 110 as the verification number.

If the identity of the smart card 110 is not verified, the transaction is rejected in block 890 and the secure communication channel 130 is terminated.

If the identity of the smart card 110 is verified, the method 230 proceeds to block 525 in FIG. 5 or as appropriate.

Returning to FIG. 2, in block 240, the merchant device 120 determines whether the smart card 110 is a new or existing card. In an example embodiment, the merchant device 120 is capable of determining whether the smart card 110 is a new or existing card from the smart card data transmitted in block 230. For example, the smart card data may indicate that the smart card 110 has not yet been activated or that a card verification number has not yet been assigned. In an alternative example embodiment, the remote system 160 may respond with information regarding the smart card 110, such as whether the smart card 110 is an existing card registered with the remote system 160 or the smart card 110 is a new card that has not been registered to a user. In another alternative example embodiment, the merchant device 120 may determine that the smart card has not yet been activated by the absence of an access key 119.

If the smart card 110 is not new but is already registered with the remote system 160, the smart card 110 transmits the entire saved transaction history from its memory 113 to the merchant device 120, in block 250. In an example embodiment, the smart card 110 transmits all deposit and withdrawal transactions to the merchant device 120. In an example embodiment, the save transaction history comprises one or more confirmations of deposits written to the smart card 110 by the merchant device 120. If the amount of the transactions exceeds the storage/memory 113 capabilities of the smart card 110, the oldest transactions are dropped from the smart card memory 113. In an example embodiment, the smart card 110 alternatively or additionally transmits the sum of deposits and the sum of withdrawals for all previous transactions to the merchant device 120.

In an example embodiment, the smart card 110 also transmits the data stored in the monotonic counters 117. The data may include the sum of deposits and/or the sum of withdrawal information. In an example embodiment, the merchant device 120 is capable of reading the data contained in the monotonic counters 117, but is incapable or writing or otherwise changing this data. In an example embodiment, the merchant device 120 uses this data to determine the smart card 110 balance. The method of determining the smart card 110 balance is described in more detail hereinafter with reference to the methods described in FIG. 10.

Figure 10:
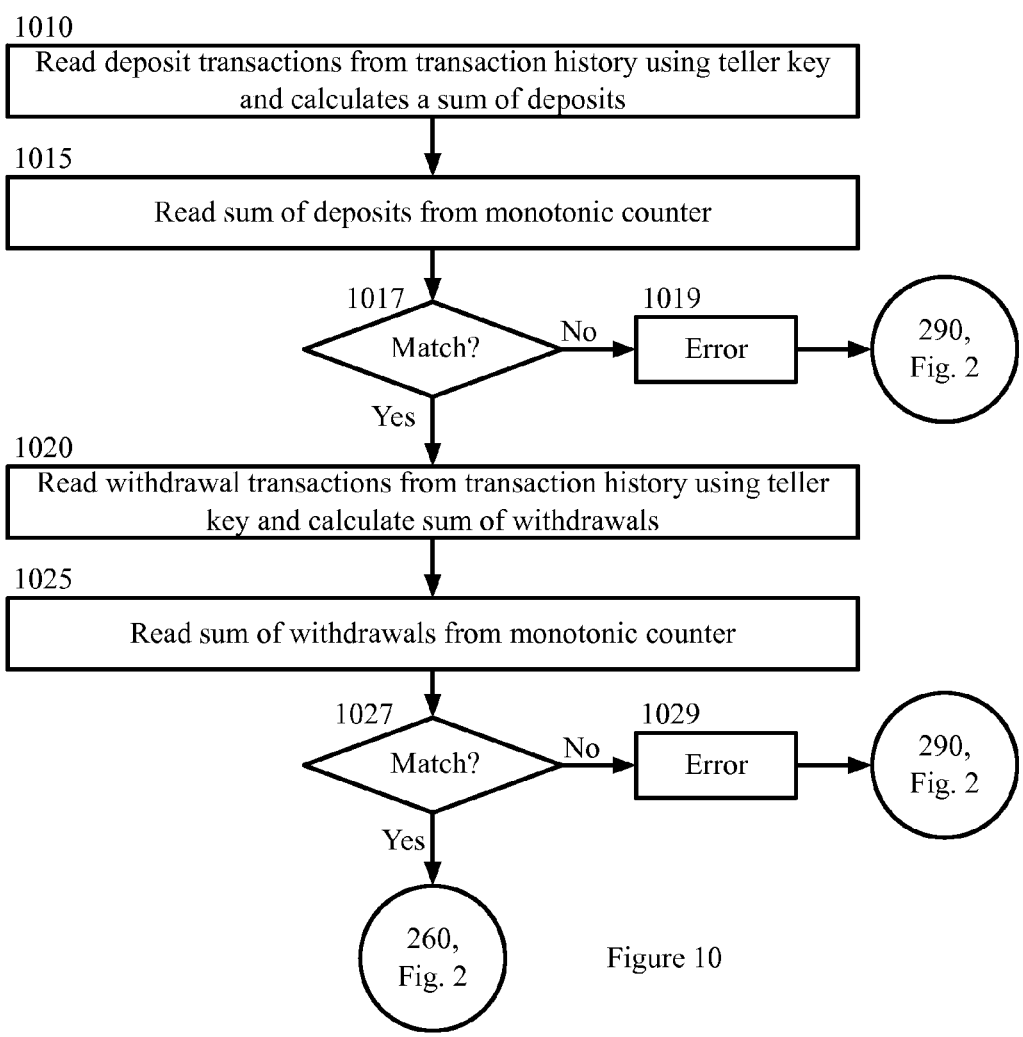
FIG. 10 is a block flow diagram depicting a method for determining the balance on a smart card, in accordance with certain example embodiments.

FIG. 10 is a block flow diagram depicting a method for determining the smart card 110 balance, in accordance with certain example embodiments, as referenced in block 255 of FIG. 2. The method 255 is described with reference to the components illustrated in FIG. 1.

In block 1010, the merchant device 120 reads the deposit transactions written in the transaction history on the smart card 110. In an example embodiment, the merchant device 120 uses the teller access key 129 to read the current deposit transactions. The merchant device 120 then calculates the sum of deposits.

In an example embodiment, a deposit transaction is recorded as:
 D1: sum of deposits before this transaction
 D2: sum of deposits after this transaction
 Notation: +,D1→D2

In block 1015, the merchant device 120 reads the sum of deposits from the monotonic counter 117.

In block 1017, the merchant device 120 compares the sum of deposits calculated in block 1010 to the sum of deposits read from the monotonic counter 117 in block 1015.

If these numbers do not match, a smart card 110 error is indicated in block 1019 and the method 255 proceeds to block 290 in FIG. 2.

If these numbers match, the method 255 proceeds to block 1020 in FIG. 10.

In block 1020, the merchant device 120 reads the withdrawal transactions written in the transaction history on the smart card 110. In an example embodiment, the merchant device 120 uses the teller key 129 to read the current withdrawal transactions. The merchant device 120 then calculates the sum of withdrawals.

In an example embodiment, a withdrawal transaction is recorded as:
 W1: sum of withdrawals before this transaction
 W2: sum of withdrawals after this transaction
 Notation: −,W1→W2

In block 1025, the merchant device 120 reads the sum of withdrawals from the monotonic counter 117.

In block 1027, the merchant device 120 compares the sum of withdrawals calculated in block 1020 to the sum of withdrawals read from the monotonic counter 117 in block 1025.

If these numbers do not match, a smart card 110 error is indicated in block 1029 and the method 255 proceeds to block 290 in FIG. 2.

If these numbers match, the method 255 proceeds to block 260 in FIG. 2.

Returning to FIG. 2, in block 260, the merchant device 120 transmits the smart card 110 transaction history to the remote system 160. In an example embodiment, the deposit transaction occurs when the merchant device 120 has network 140 access, allowing for simultaneous transmission of the smart card 110 transaction history to the remote system 160. In an alternative embodiment, the smart card 110 transaction history is stored on the merchant device 120 and transmitted to the remote system 160 at a later time after the completion of the deposit of funds via a wireless or wired network connection 140. In an example embodiment, the transaction history comprises one or more deposit confirmations.

In an example embodiment, the card identification information is transmitted to the remote system 160 with the transaction history. The card identification information comprises the card account number and the card verification number. The transmission of the card identification information enables the remote system 160 to associate the transaction history with the correct smart card 110 account and to confirm the identity of the smart card 110. The methods for confirming the identity of the smart card 110 are described above with reference to method 230 in FIG. 8.

After the smart card 110 transactions are transmitted to the remote system 160, the remote system 160 analyzes and synchronizes the transactions, in block 270. In an example embodiment, block 270 occurs immediately after the transmission of the transactions to the remote system 160. In an alternative example embodiment, block 270 occurs at a later time or at a set durational time period (for example, every 24 hours). The method 270 of synchronizing smart card 110 transactions on the remote system 160 is described in more detail hereinafter with reference to the methods described in FIG. 7.

The method 200 then proceeds to block 280 in FIG. 2.

Returning to block 240, if the smart card 110 is new, the new card is activated and/or a new account is created at block 245. The method for creating a new smart card account is described in more detail hereinafter with reference to the methods described in FIGS. 4a and 4b.

If the smart card 110 is new, a new account is created at block 245. In an example embodiment, the user creates a new user account or logs into an existing account via the remote system 160, with which the smart card 110 will be associated. The method 245a depicted in FIG. 4a describes associating a new smart card with a new or existing user account at the remote system 160.

In an alternative example embodiment, the user activates a new smart card 110 without creating or logging into a remote system 160 account. In this case, only a smart card account is created at the remote system 160. The method for activating a new smart card 110 without a user account is described in more detail hereinafter with reference to the methods described in FIG. 4*b*.

Figure 4A:
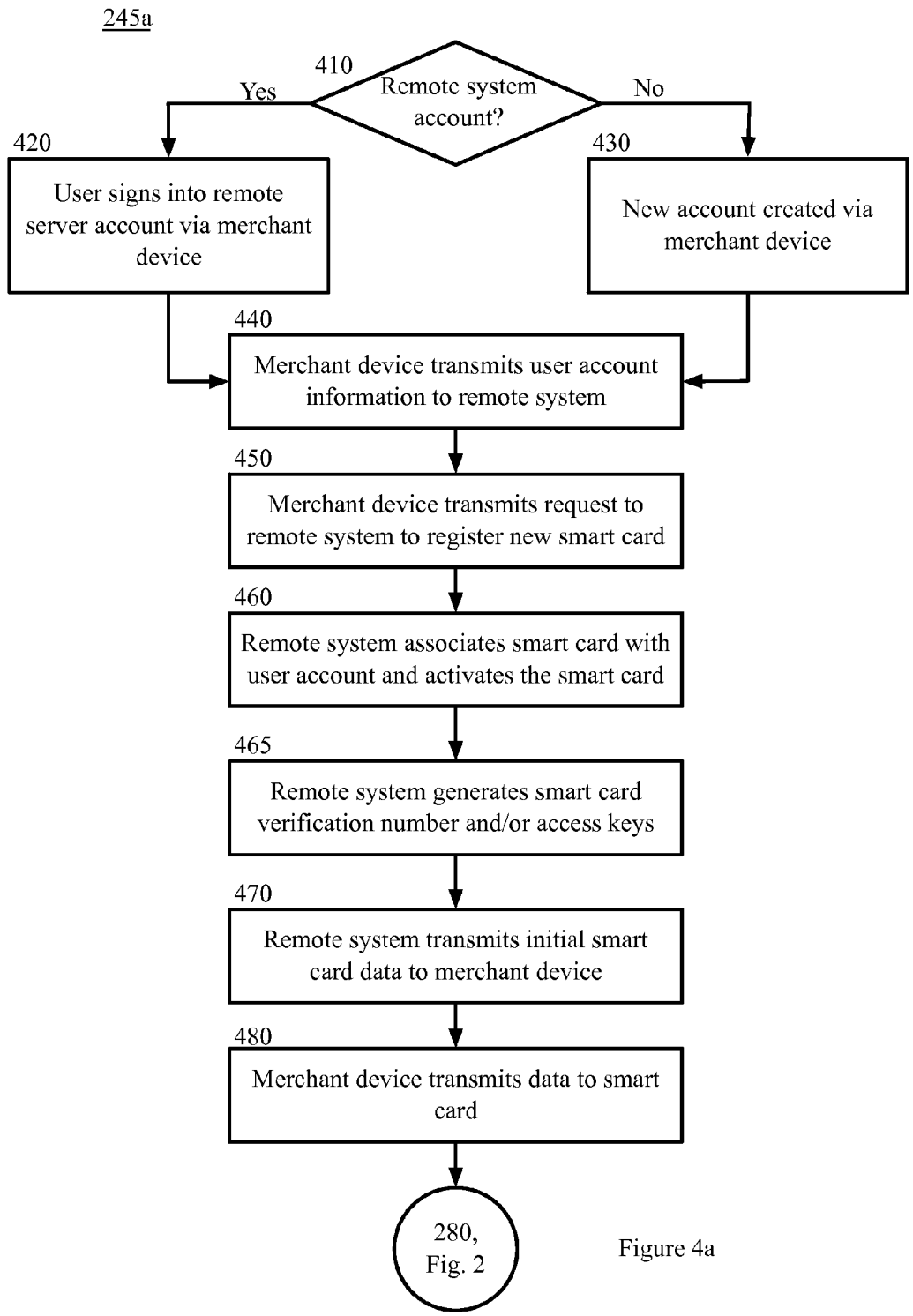
FIG. 4a is a block flow diagram depicting a method for creating a remote system user account for association with a smart card account, in accordance with certain example embodiments.

FIG. 4*a* is a block flow diagram depicting a method 245*a* for creating a remote system 160 user account for association with a smart card 110, in accordance with certain example embodiments, as referenced in block 245 of FIG. 2. The method 245*a* is described with reference to the components illustrated in FIG. 1.

Referring to FIG. 4*a*, in block 410, the merchant device 120 determines whether the user has a remote system 160 account. In an example embodiment, the deposit transaction occurs when the merchant device 120 has network 140 access, allowing for simultaneous transmission of the smart card 110 transaction history to the remote system 160 and determination as to whether the user has a remote system 160 account. In an alternative example embodiment, the merchant device 120 reads an indication from the smart card 110 as to whether the user has a remote system 160 account.

If the user has a remote system 160 account, the user signs into the account via the merchant device 120, in block 420. In an example embodiment, the user utilizes the user interface 121 of the merchant device 120 to communicate with the remote system 160 to access the user's account. For example, the user may input a personal identification number or other identifying and/or authentication information to identify and access the user's account at the remote system 160.

If the user does not have a remote system 160 account, the user may create a new account via the merchant device 120, in block 430. In an example embodiment, the user utilizes the user interface 121 of the merchant device 120 to communicate with the remote system 160 to create an account. The user may be prompted to enter identifying information, for example, user name, phone number, e-mail address, personal identification number or other password, or other suitable information to create the user account.

In block 440, the merchant device 120 transmits the user account information to the remote system 160. Portions or all of block 440 may occur simultaneously with performance of blocks 420 or 430. In an example embodiment, the merchant device 120 has network 140 access and transmits the user account information using a wireless connection. In an alternative example embodiment, the merchant device 120 is connectively coupled via a wired connection to a computer that accesses the remote system 160.

In block 450, the merchant device 120 transmits a request to the remote system 160 to register a new smart card 110 with the user's account. In an example embodiment, the request includes information to identify the card, such as a card number or other identifying information stored on the smart card 110. The request also may include the date the card was registered (for example, a time stamp), where the card was registered (for example, information identifying the merchant that registered the card), user information, or other suitable information.

The remote system 160 associates the smart card 110 with the user's account and activates the smart card 110, in block 460. In an example embodiment, the remote system 160 notes the information included in the request in the user account to allow the user to view the smart card 110 transaction history, sum of withdrawals, and sum of deposits by logging onto the user's remote system 160 account.

In block 465, the remote system 160 generates a card verification number and assigns this number to the smart card 110. The card verification number is a number specific to the smart card account number. In an example embodiment, the card verification number is a 32-bit number randomly generated by the remote system 160. The card verification number is encoded in data that will be written on the smart card 110 and used to identify the smart card 110 to the remote system 160. In an example embodiment, the remote system 160 also generates one or more access keys 119 for the smart card 110.

In block 470, the remote system 160 transmits the initial smart card 110 data to the merchant device 120. In an example embodiment, the initial data comprises activation data for the smart card 110, which allows the smart card 110 to be used for purchase and/or deposit transactions. In an example embodiment, the activation data also comprises the card verification number. In an example embodiment, the activation data includes one or more access keys 119.

In block 480, the merchant device 120 transmits the activation data to the smart card 110 and the activation data is stored in the memory 113 of the smart card 110. In an example embodiment, the activation data is not stored in the merchant device. The smart card data, including the activation data is wiped from the merchant device 120 when the secure communication channel 130 is terminated.

From block 480, the method 245*a* proceeds to block 280 in FIG. 2 and funds are deposited onto the smart card 110.

Figure 4B:
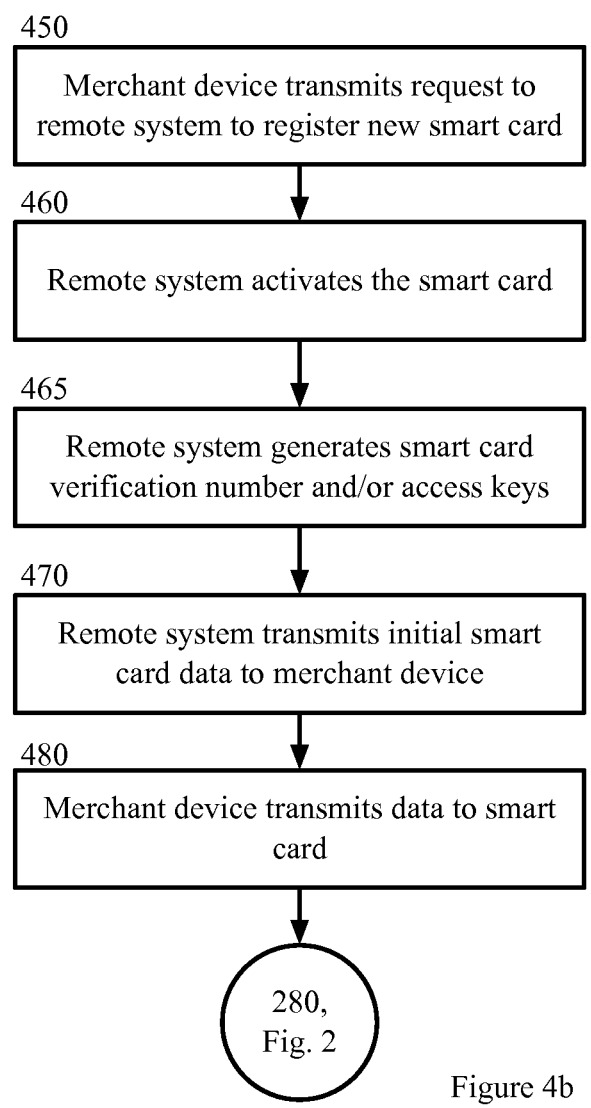
FIG. 4b is a block flow diagram depicting a method for activating a new smart card without associating the smart card with a remote system user account, in accordance with certain example embodiments.

FIG. 4*b* is a block flow diagram depicting a method 245*b* for activating a new smart card 110 without associating the smart card 110 with a remote system 160 user account according to an example embodiment, as referenced in block 245 of FIG. 2. The method 245*b* is described with reference to the components illustrated in FIG. 1.

Blocks 450, 465, 470, and 480 depicted in FIG. 4*b* are similar to blocks 450, 465, 470, and 480 depicted in FIG. 4*a*.

Referring back to FIG. 2, the merchant device 120 detects the smart card 110 and establishes a secure communication channel 130 in block 220, and the merchant device 120 identifies the smart card 110, in block 230. The merchant device 120 then determines whether the smart card 110 is a new or existing card, in block 240. In an example embodiment, the user activates a new smart card 110 without creating or logging into a remote system 160 account.

In block 450, the merchant device 120 transmits a request to the remote system 160 to register a new smart card 110.

The remote system 160 activates the smart card 110, in block 460. In an example embodiment, the remote system 160 logs the smart card activation information in a database. The smart card activation information may comprise one or more of the following: card account number, date of activation, location of activation and merchant identification. In an alternative example embodiment, the remote system 160 assigns a personal identification number (PIN) or other authentication code to the smart card 110.

In block 465, the remote system 160 generates a card verification number and assigns this number to the smart card 110. The card verification number is a number specific to the smart card account number. In an example embodiment, the card verification number is a 32-bit number randomly generated by the remote system 160. The card verification number is encoded in data that will be written on the smart card 110 and used to identify the smart card 110 to the remote system 160. In an example embodiment, the remote system 160 also generates one or more access keys 119 for the smart card 110.

In block 470, the remote system 160 transmits the initial smart card 110 data to the merchant device 120. In an example embodiment, the initial data includes the activation data for the smart card 110 and may include the assigned PIN.

The merchant device 120 transmits the activation data to the smart card, in block 480, which stores the activation data in the memory 113.

From block 480, the method 245b proceeds to block 280 in FIG. 2 and funds are deposited onto the smart card 110.

Returning to FIG. 2, in block 280, the merchant device 120 deposits funds onto the smart card 110. The method of depositing funds is described in more detail hereinafter with reference to the methods described in FIG. 3.

The method 200 then proceeds to block 290 in which the secure communication channel 130 between the smart card 110 and the merchant device 120 is terminated. In an example embodiment, the smart card activation data from block 245, if applicable, is wiped from the merchant device 120 upon termination of the secure communication channel 130 between the smart card 110 and the merchant device. In an alternative example embodiment, all smart card data is wiped from the merchant device 120 upon termination of the secure communication channel 130 between the smart card 110 and the merchant device.

Figure 9:
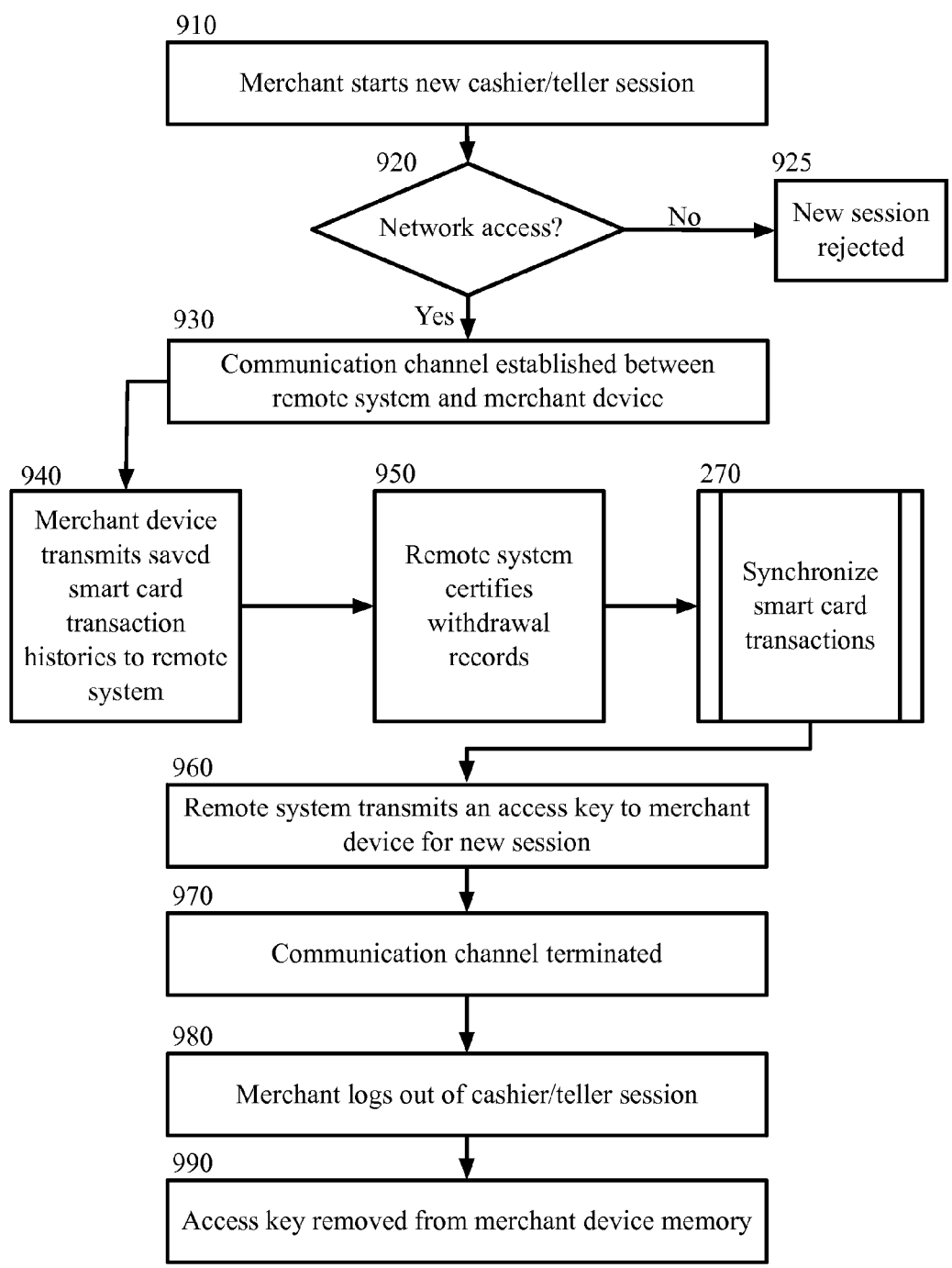
FIG. 9 is a block flow diagram depicting a method for transmitting an access key, in accordance with certain example embodiments.

FIG. 9 is a block flow diagram depicting a method for transmitting an access key 129 to a merchant device 120, in accordance with certain example embodiments. The method 900 is described with reference to the components illustrated in FIG. 1.

In an example embodiment, an access key 129 resident on the merchant device 120 and/or the card reader 150 is used in combination with one or more monotonic counter 117 resident on the smart card 110 to allow for the verification of a transaction while the payment system 100 is operating offline. An example payment system 100 allows for the verification of the transaction by the payment device, i.e., the merchant device 120 and/or card reader 150, instead of by the remote system 160 at the time of the transaction.

In block 910, the merchant starts a new cashier or teller session. An example cashier session involves the designation of the merchant device 120 and/or card reader 150 as devices to transact a withdrawal of funds from the smart card 110. An example teller session involves the designation of the merchant device 120 and/or card reader 150 as devices to transact a deposit of funds onto the smart card 110.

In an example embodiment, the merchant is required to start a new session when logging onto the merchant device 120. In an alternative example embodiment, the merchant is required to start a new session when a maximum number of transactions or time limit has been reached since the previous session was started.

In an example embodiment, the merchant enters the session information with the user interface 121 of the merchant device. In an example embodiment, a pop-up window appears after the merchant device 120 is started. In an alternative example embodiment, the merchant accesses an application 122 to start a new session.

In block 920, the merchant device 120 determines whether it has network 140 access. In an example embodiment, a new session must be authorized by the remote system 160 and results in the transmission of an access key 129 to the merchant device 120 and/or card reader 150. The merchant device 120 has network 140 access, to provide for such authorization and transmission.

If the merchant device 120 is without network 140 access, the new session is rejected, in block 925 and the method 900 ends.

If the merchant device 120 has network 140 access, the method 900 proceeds to block 930.

In block 930, a communication channel is established between the remote system 160 and the merchant device 120.

If the merchant device 120 has not had network 140 access and established a communication channel with the remote system 160 since performing one or more withdrawal transactions with a smart card 110, the method 900 proceeds to blocks 940, 950 and 270. The methods for withdrawing funds from a smart card 110 are described in more detail hereinafter with reference to the methods described in FIGS. 5-8.

In block 940, the merchant device 120 transmits any saved smart card 110 transaction histories and withdrawal records to the remote system 160. In an example embodiment, the merchant device 120 also transmits the card identification information to the remote system 160. In an example embodiment, the transaction histories comprise one or more deposit confirmations. In this embodiment, the remote system 160 receives the deposit confirmation, determines whether the confirmation has been previously received by accessing the user account and reviewing the deposit records, and updates the user account to include the deposit confirmation as needed.

In block 950, the remote system 160 certifies the withdrawal records transmitted by the merchant device 120. In an example embodiment, the remote system 160 certifies the withdrawal records using the cashier signing key 167 resident on the remote system 160. The cashier signing key verifies the session information contained in withdrawal record as signed by cashier access key 129 resident on the merchant device 120 at the time the withdrawal record was created. In an example embodiment, the cashier signing key 167 is utilized to authenticate and certify data contained in the withdrawal record by the remote system 160. Once the cashier signing key 167 certifies the withdrawal record, a notation is made onto the record for future access/reading by a merchant device 120 or card reader 150 with a valid access key 129 or 159.

After the smart card 110 transactions are transmitted to the remote system 160, the remote system 160 analyzes and synchronizes the transactions, in block 270, which is similar to the block 270 referenced in FIG. 2. In an example embodiment, this action occurs in real-time with (in other words, immediately after) the transmission of the transactions to the remote system 160. In an alternative example embodiment, this action occurs at a later time or at a set durational time period (for example, once every 24 hours). The method 270 of synchronizing smart card 110 transactions on the remote system 160 is described in more detail hereinafter with reference to the methods described in FIG. 7.

In an example embodiment, a transaction made by mistake, may be reverted by a merchant. The merchant sends the original transaction identification to the remote system 160 and requests reversion of the transaction. In an example embodiment, the remote system 160 creates a new transaction for the same amount, but as an opposite type of transaction (for example, to revert a withdrawal, the transaction type would be a deposit). The original transaction is still maintained in the transaction history, but the smart card 110 balance is corrected the next time the smart card is connected to a merchant device 120 with network 140 access to the remote system 160.

If the no withdrawal transactions have occurred since the last session was started by the merchant device 120, the method 900 proceeds directly to block 960.

In block 960, the remote system 160 authenticates the merchant device 120 and transmits an access key 129 for the new session. In an example embodiment, the merchant designates whether the merchant device 120 will be used for deposit or withdrawal transactions by entering the correct session designation into the user interface 121 on the merchant device 120. In an alternative example embodiment, the merchant designates the merchant device 120 as performing both types of transactions. In an additional alternative example embodiment, the merchant does not designate a type of session and the merchant device 120 is designated for a particular session type or both types of sessions by the remote system 160.

In an example embodiment, the appropriate session access key 129 is transmitted to the merchant device 120 by the remote system 160. The remote system 160 maintains a log of which session access key 129 is transmitted to each merchant device 120. In an example embodiment, the log contains a list of each session access key 129 transmitted to the merchant device 120 over a period of time. The remote system 160 can access the log to cross-reference the deposit/withdrawal records and determine which merchant device 120 created each record. In an example embodiment, this may also allow the remote system 160 to determine the date, time, location, and/or merchant name that created the record.

In block 970, the communication channel between the merchant device 120 and the remote system 160 is terminated. In an example embodiment, a merchant device 120 that is designated for deposit transactions and has received a teller session access key 129 will remain connected to the remote system 160 for the duration of the session. Because deposit transactions require network access, the merchant device 120 will not terminate the communication channel. Upon termination of the communication channel, the session is ended and a new session key is required to conduct additional transactions. In an alternative example embodiment, the merchant device 120 may terminate the communication channel with the remote system 160 and re-establish a connection prior to conducting a deposit transaction without requiring a new session key.

In an example embodiment, a merchant device 120 that is designated for withdrawal transactions and has received a cashier session access key 129 may terminate the communication channel at any time during the session. Because withdrawal transactions do not require network access, the merchant device 120 may terminate the communication channel at any time without requiring a new session key to conduct the withdrawal transactions.

In an example embodiment, the session access key 129 transmitted to the merchant device 120 is used until the merchant logs out of the device or ends the session. In an alternative example embodiment, the session access key 129 has a defined duration, geographical perimeter, and/or maximum number of transactions quota that may also terminate the session key.

In block 980, the merchant logs out of the merchant device 120, ends the session, or otherwise terminates the session access key 129. In an example embodiment, one or more transactions may occur, as described in more detail in this specification, with reference to the methods described herein before the session is terminated.

In block 990, the session access key 129 is removed from the merchant device 120. In an example embodiment, the session access key 129 is wiped from the merchant device 120 memory when the session is terminated. In an example embodiment, the session access key is not written to the device. Instead, the device is briefly stored in the memory of the device 120 and is removed upon termination of the session to prevent a malicious actor from reading the access key data is the merchant device 120 is compromised or not running.

Figure 3:
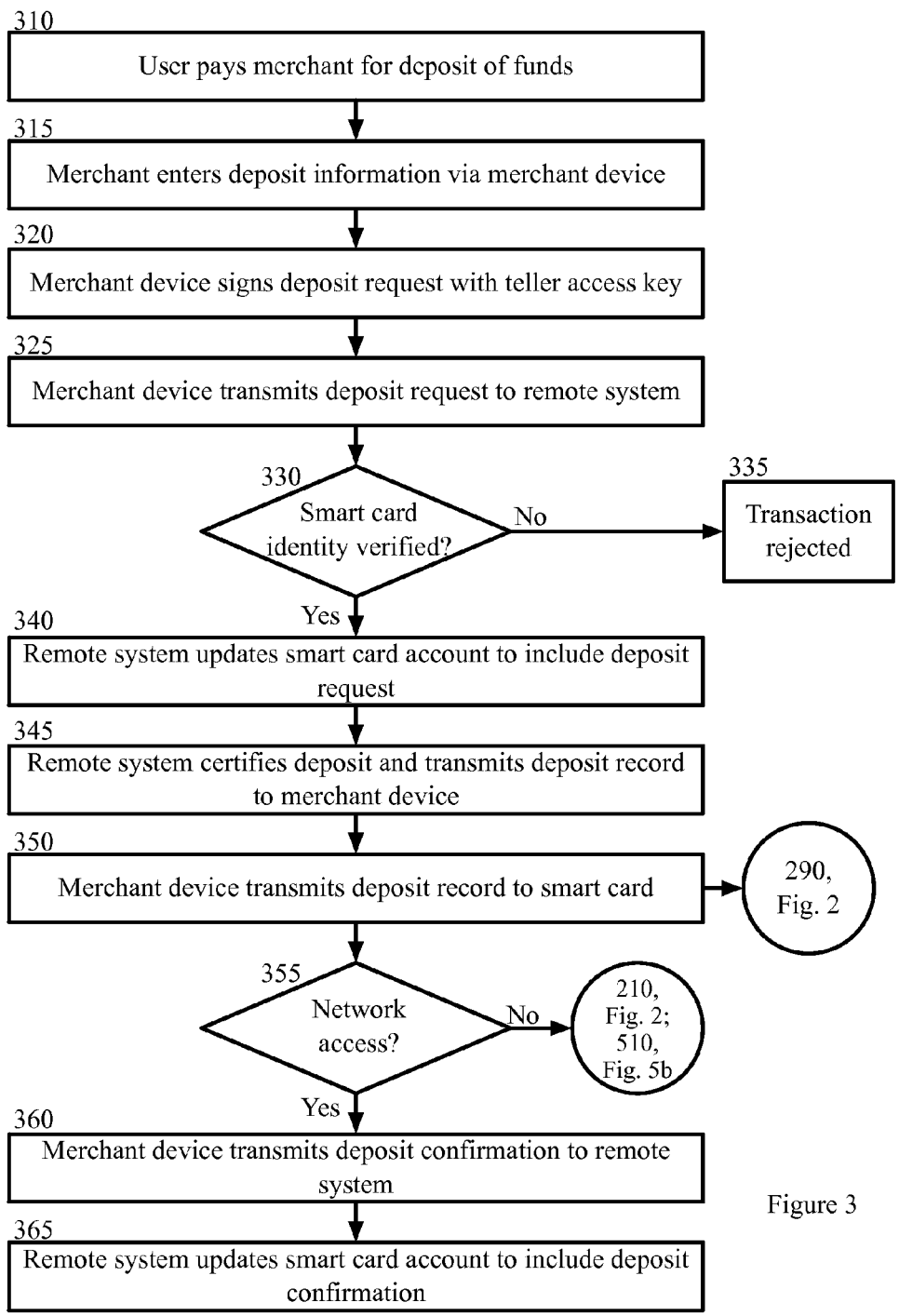
FIG. 3 is a block flow diagram depicting a method for writing a deposit record to a smart card, in accordance with certain example embodiments.

FIG. 3 is a block flow diagram depicting a method for writing a deposit of funds to a smart card 110 via a merchant device 120, in accordance with certain example embodiments, as referenced in block 280 of FIG. 2. The method 280 is described with reference to the components illustrated in FIG. 1.

In block 310, the user pays the merchant for the deposit of funds. In an example embodiment, the payment is a cash payment. In an alternative example embodiment, the payment is a credit card payment or other electronic payment. In this embodiment, payment may be made using a merchant tap of the credit card to the merchant device or by swiping the credit card or other card with a credit card reader.

The merchant enters the deposit information into the merchant device 120, in block 315. In an example embodiment, the merchant enters the deposit information with the user interface 121 of the merchant device. In an example embodiment, a pop-up window appears after the smart card 110 transaction history is transmitted to the remote system 160. In an alternative example embodiment, the merchant accesses an application 122 to enter the deposit information.

In block 320, the merchant device creates a deposit request and signs the request with the teller access key 129. In an example embodiment, the teller access key 129 was transmitted to the merchant device 120 prior to the start of a new session, as described above with reference to FIG. 9. In an example embodiment, a signature by the teller access key 129 identifies the merchant, merchant device 120, date, time and/or location where the deposit request was created. Because of the access/permission limitations of the teller access key 129, the merchant device 120 cannot write deposit data to the smart card 110. Instead, the merchant device 120 creates a deposit request that must be certified by the remote system 160 before the deposit of funds are available for use by the smart card 110. In an alternative example embodiment, the deposit request is maintained in the transaction history of smart card 110 and may be accessed/read by a merchant device 120 during future transactions.

In block 325, the merchant device transmits a deposit request to the remote system 160 via a network 140. In an example embodiment, the deposit request comprises the deposit amount, smart card identification information, a timestamp, and the merchant identification. In an example embodiment, the smart card identification information includes the card account number and the card verification number. In an example embodiment, the card identification information is encoded in the smart card data transmitted to or read by the merchant device 120 in block 230. In an example embodiment, the deposit request also includes the teller access key 129 signature, which is readable by the remote system 160 and may denote the date, time, location, merchant name and/or merchant device 120 that created the deposit request.

In block 330, the remote system 160 verifies the identity of the smart card. In an example embodiment, the remote system 160 is capable of identifying the smart card 110 from the data transmitted in the deposit request. The remote system 160 cross-references the card account number and the card verification number to confirm the correct card verification number is encoded by in the card identification data. In an alternative example embodiment, the remote system 160 maintains network 140 access to the merchant device 120 and has already confirmed the identity of the smart card 110 in block 230 of FIG. 2.

If the identity of the smart card 110 is not verified, the transaction is rejected in block 335.

If the identity of the smart card 110 is verified, the method 280 proceeds to block 340. In block 340, the remote system 160 updates the account associated with the smart card 110 to include the deposit of funds and calculates a new sum of deposits for the smart card 110. In this regard and as described herein with reference to the records of the smart card 110 maintained by the remote system 160, the remote system 160 can maintain an account for each smart card 110. Each account for a particular smart card 110 can comprise one or more of information maintained on the smart card 110, user registration information, transaction history, and other information for maintaining the smart card 110. The remote system 160 can store each account record in the database 161.

In block 345, the remote system 160 authorizes and certifies the deposit using the teller signing key 167 and transmits the deposit record to the merchant device 120. In an example embodiment, the remote system 160 reviews the signed deposit request and authorizes the teller access key 129 signature. The remote system 160 accesses a master key to confirm that authenticity of the teller access key 129 signature. In an alternative example embodiment, the remote systems 160 may review additional details, such as the number of transactions performed during the session, any geographic location restraints, any restrictions on size or amount of deposit allowed, and/or any additional possible restraints placed on the teller access key 129 to confirm the key is active.

In block 350, the merchant device 120 transmits the deposit record to the smart card 110. In an example embodiment, the deposit record comprises the new sum of deposits, the card identification, a time stamp, a merchant identification, a signature by the teller access key 129 and certification by the teller signing key 167. In an example embodiment, the merchant device 120 writes the certified deposit record to the smart card 110 using the teller access key 129.

From block 350, the method 280 proceeds to block 290 in FIG. 2 and to block 355 in FIG. 3.

In block 355, the merchant device 120 determines whether it has network 140 access. In an example embodiment, the merchant device 120 maintains network 140 access with the remote system 160 during the transmission of the deposit record to the smart card 110 and the methods described in block 360 occur in real-time with (in other words, immediately after) the transmission of the deposit record to the smart card 110.

If the merchant device 120 has network 140 access, the merchant device 120 transmits the deposit confirmation to the remote system 160, in block 360. In an example embodiment, the deposit record was successfully transmitted to the smart card 110 in block 350 in FIG. 3 and the deposit confirmation confirms the successful transmission. In an alternative example embodiment, the deposit record was not successfully transmitted to the smart card 110 in block 350 in FIG. 3, and the merchant device 120 transmits a deposit failure record to the remote system 160.

In block 365, the remote system 160 updates the smart card 110 account to include the deposit confirmation received from the merchant device 120. In an example embodiment, the remote system 160 identifies deposit transaction wherein it has not received a deposit confirmation and flags these transactions as needing updating. In an alternative example embodiment, the deposit transaction is not written to the smart card 110 account until the deposit confirmation is received. In another alternative example embodiment, the deposit transaction is recorded in a "pending" transaction table in the smart card 110 account and then recorded in an "approved" transaction table in the smart card 110 account once the deposit confirmation is received. In an example embodiment, the remote system 160 knows it is suppose to receive a deposit confirmation after reviewing the smart card 110 account and is signaled to review the transaction history for such confirmation. In an alternative example embodiment, the remote system 160 receives a deposit confirmation for a transaction it did not authorize and can flag the transaction as potentially fraudulent.

Returning to block 355 in FIG. 3, in an alternative example embodiment, the merchant device 120 is unable to maintain network 140 access with the remote system 160 or the network 140 access is insufficient to perform the methods described in block 360. In this embodiment, the merchant device 120 transmits the deposit confirmation to the remote system 160 when sufficient network 140 access is available and the method proceeds to block 210 in FIG. 2, block 510 in FIG. 5, or as appropriate.

In an alternative example embodiment, the merchant device 120 is unable to obtain network 140 access and the method proceeds to block 210 in FIG. 2, block 510 in FIG. 5, or as appropriate without transmitting the deposit confirmation to the remote system 160. In this embodiment, the deposit confirmation is not transmitted to the remote system 160 and the smart card account is not updated to reflect the deposit confirmation. However, the smart card 110 has received the deposit record from the merchant device 120 and the balance of the smart card 110 has been updated to reflect the deposit of funds. The smart card 110 transaction history has been updated to include the deposit confirmation, so the smart card account maintained by the remote system 160 will be updated to include the deposit confirmation when the smart card 110 transaction history is next transmitted to the remote system 160 (for example, according to the methods described in blocks 250 in FIG. 2, block 525 in FIG. 5a, block 940 in FIG. 9, or as appropriate).

In an alternative embodiment, the user may deposit funds to the remote system 160 using a computer (not illustrated) and network 140. In this embodiment, the user makes a payment of funds to the remote system 160, and the remote system 160 associates the funds with the account corresponding to the particular smart card 110 in the possession of the user, based on identification information of the smart card 110. The user can deposit funds to the remote system 160 using any electronic payment method accepted by the remote system 160 and available to the user via the computer operated by the user. The funds are not stored on the smart card 110 until the user taps the smart card 110 with a merchant device 120, where the merchant device 120 has communication access with the remote system 160 via the network 140. Blocks 310-325 may be omitted from the method 280, and the funds may be deposited on the smart card 110 by following blocks 330-345 upon identification of the smart card 110 to the remote system 160 by the merchant device 120. For example, after the transaction history is communicated to the remote system 160 at block 260, the remote system 160 confirms the identity of the smart card 110 using the card account number and card verification number and then transmits a deposit record to the merchant device 120 at block 350.

FIG. 5 is a block flow diagram depicting a method 500 for processing a withdrawal of funds from a smart card 110 via a merchant device 120, in accordance with certain example embodiments. The method 500 is described with reference to the components illustrated in FIG. 1.

In an example embodiment, a withdrawal transaction does not require remote system 160 authorization. The merchant device 120 may or may not have network 140 access at the time of the transaction.

In block 510, the user "taps" the smart card 110 in the proximity of the merchant device 120. In an example embodiment, the card reader 150 that reads information from the smart card 110 is a part of the merchant device 120. In an alternative example embodiment, the card reader 150 is a separate stand-alone device in communication with a computer, such as the merchant device 120.

In an example embodiment, the merchant device 120 generates a radio frequency (RF) or other field polling for the presence of a smart card 110, and the user "taps" the smart card 110 by placing the card 110 within the field of the merchant device 120. In an alternative example embodiment, the merchant activates the RF field or other field to poll for the presence of a smart card 110 using an application 155 on the card reader 150. In certain example embodiments, the systems and methods described in FIGS. 5-6 herein are performed while the smart card 110 is tapped.

The merchant device 120 detects the smart card 110 and establishes a secure communication channel 130 in block 515. In an example embodiment, the secure communication channel 130 is an NFC communication channel.

The merchant device 120 identifies the smart card 110, in block 270, which is similar to the block 230 referenced in FIGS. 2 and 8.

If the identity of the smart card 110 is not verified, the transaction is rejected.

If the identity of the smart card 110 is verified, the method 500 proceeds to block 525 in FIG. 5.

Returning to FIG. 5, in block 525, the smart card 110 transmits the entire saved transaction history from its memory 113 to the merchant device 120. In an example embodiment, the smart card 110 transmits all deposit and withdrawal transactions to the merchant device 120, including all deposit confirmations. If the amount of the transactions exceeds the storage/memory 113 capabilities of the smart card 110, the oldest transactions are dropped from the smart card memory 113. In an example embodiment, the smart card 110 alternatively or additionally transmits the sum of deposits and the sum of withdrawals for all previous transactions to the merchant device 120. In an alternative example embodiment, the smart card 110 transmits the last deposit transaction and the entire saved withdrawal transaction history from its memory 113 to the merchant device 120. If the amount of withdrawals exceeds the storage/memory 113 capability of the smart card 110, the oldest transactions are dropped from the smart card memory 113. In an example embodiment, the transmission of the withdrawal history includes the last several withdrawal transactions to ensure if a particular merchant device 120 doesn't come back online its transactions still get transmitted to the remote system 160.

In block 530, the merchant device 120 determines whether the smart card 110 has a sufficient balance for the transactions. The method of determining the balance of funds on a smart card 110 is described in more detail hereinafter with reference to the methods described in FIG. 6.

Figure 6:
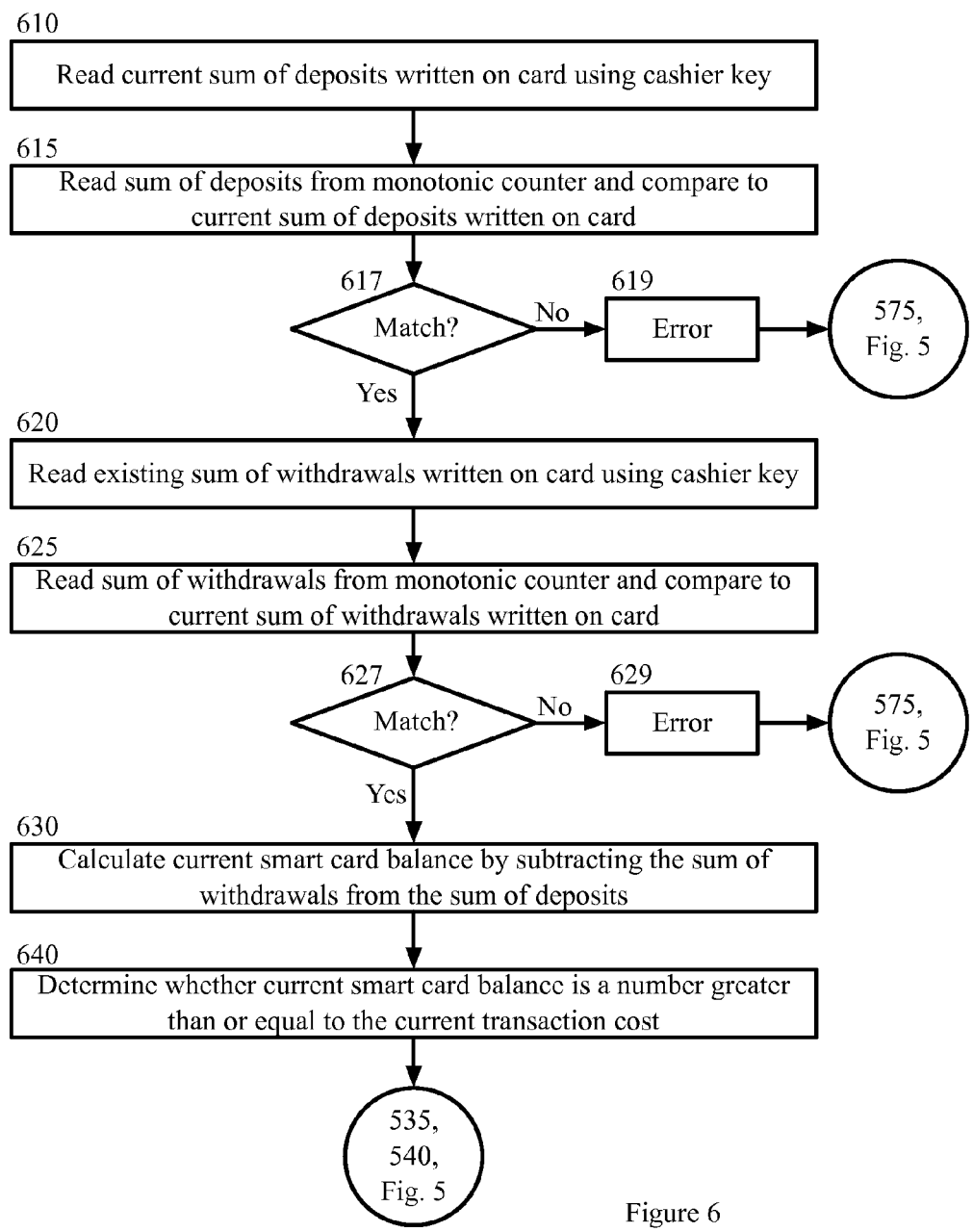
FIG. 6 is a block flow diagram depicting a method for determining whether a smart card has a sufficient balance of funds for a withdrawal transaction, in accordance with certain example embodiments.

FIG. 6 is a block flow diagram depicting a method 530 for determining whether a smart card 110 has a sufficient balance of funds for a withdrawal transaction, in accordance with certain example embodiments. The method 530 is described with reference to the components illustrated in FIG. 1.

In an example embodiment, determining the smart card 110 balance will require the transmission of the entire transaction history in block 525 in FIG. 5) and the transmission of the monotonic counter 117 in block 820 in FIG. 8. In an alternative example embodiment, it may be difficult to determine the smart card 110 balance using the remote system 160 records, since a withdrawal may or may not occur when the merchant device 120 has network access to the remote system 160. Therefore, the sum of deposits and sum of withdrawals will be calculated and saved on the smart card 110 may be at least a part of the transaction history stored on the smart card 110.

In block 610, the merchant device 120 reads the current sum of deposits from the smart card 110. In an example embodiment, the merchant device 120 contains the entire transaction history transmitted from the smart card 110, at block 525 in FIG. 5 and calculates the sum of deposits using the transaction history. In an alternative example embodiment, the transaction history includes a current sum of deposits. In this embodiment, the merchant device 120 reviews the current sum of deposits entry from the transaction history.

In block 615, the merchant device 120 reads the monotonic counter 117 and compares this to the sum of deposits calculated in block 610. In an example embodiment, the monotonic counter 117 contains the sum of deposits. The merchant device 120 is capable of reading the data contained in the monotonic counters 117, but is incapable or writing or otherwise changing this data. Because the sum of deposit is store in the monotonic counter (which can only be incremented, not decreased), a smart card 110 that has been rolled back to a previous state can be detected and inactivated.

In block 617, the sum of deposits calculated in block 610 and the sum of deposits read from the monotonic counter 117 in block 615 are compared. In an alternative example embodiment, a monotonic counter 117 is increased during each deposit transaction and the total number of deposit transactions saved in the transaction history is compared to the number designated by the monotonic counter 117.

If the number do not match, an error is indicated in block 619 and the method 530 proceeds to block 575 in FIG. 5.

If the numbers do match, the method 530 proceeds to block 620.

In block 620, the merchant device 120 reads the current sum of withdrawals from the smart card 110. In an example embodiment, the merchant device 120 contains the entire transaction history transmitted from the smart card 110, at block 525 in FIG. 5 and calculates the sum of withdrawals using the transaction history. In an alternative example embodiment, the transaction history includes the sum of withdrawals. In this embodiment, the merchant device 120 reviews the current sum of withdrawals from the transaction history.

In block 625, the merchant device 120 reads the monotonic counter 117 and compares this to the sum of withdrawals calculated in block 620. In an example embodiment, the monotonic counter 117 contains the sum of withdrawals. The merchant device 120 is capable of reading the data contained in the monotonic counters 117, but is incapable or writing or otherwise changing this data. Because the sum of withdrawals is store in the monotonic counter (which can only be incremented, not decreased), a smart card 110 that has been rolled back to a previous state can be detected and inactivated.

In block 627, the sum of withdrawals calculated in block 620 and the sum of withdrawals read from the monotonic counter 117 in block 625 are compared. In an alternative example embodiment, a monotonic counter 117 is increased during each withdrawal transaction and the total number of withdrawal transactions saved in the transaction history is compared to the number designated by the monotonic counter 117.

In an example embodiment, the remote system 160 will have the current sum of deposits, since these transactions are completed while the merchant device 120 has network 140 access to the remote system 160. The remote system 160 may not have the current sum of withdrawals, since the merchant device 120 may or may not have network 140 access to the remote system 160 at the time of the transaction, but the remote system 160 will have the sum of withdrawals at the time of the last synchronization. The merchant device 120 reads the current sum of withdrawals by reading the last withdrawal transaction from the smart card 110 and the current sum of deposits by reading the last deposit transaction from the smart card 110.

If the number do not match, an error is indicated in block 626 and the method 530 proceeds to block 575 in FIG. 5.

If the numbers do match, the method 530 proceeds to block 630.

In block 630, the merchant device 120 calculates the current smart card 110 balance. In an example embodiment, the balance is calculated by subtracting the sum of withdrawals from the sum of deposits. In an example embodiment, the merchant device 120 can calculate the lower boundary of the card balance. For example:

Balance≥last known sum of deposits−last known sum of withdrawals

For example, using the following transaction history:

| | |
|---|---|
| A new card is created with zero balance | +, 0→0 |
| | −, 0→0 |
| Deposit 20 | +, 0→20 |
| Withdraw 4 | −, 0→4 |
| Withdraw 8 | −4→12 |
| Deposit 10 | +20→30 |
| Withdraw 7 | −, 12→19 |
| Withdraw 2 | −, 19→21 | the current card balance can be calculated using the last deposit and withdrawal transactions:
+,20→30
−,19→21

Balance=30−21=9

In block 640, the merchant device 120 determines whether the smart card 110 balance is a number greater than or equal to the current transaction cost. In an example embodiment, the smart card 110 balance may not be a negative number (in other words, the smart card 110 may not become overdrawn).

In an alternative example embodiment, the smart card 110 calculates and stores a balance in the memory 113 after each transaction. In yet another example embodiment, the smart card 110 stores a running list of all transactions and the balance is calculated by adding/subtracting each transaction as appropriate.

From block 640, the method 530 proceeds to block 540 or block 535 in FIG. 5.

Returning to FIG. 5, if the merchant device 120 determines in block 530 that the smart card 110 does not have a sufficient balance for the transaction, the transaction is rejected in block 535, and the secure communication channel 130 is terminated.

If the merchant device 120 determines in block 530 that the smart card 110 has a sufficient balance for the transaction, the merchant device 120, the method proceeds to block 537.

In block 537, the merchant device creates a withdrawal record and signs the record with the cashier access key 129. In an example embodiment, the cashier access key 129 was transmitted to the merchant device 120 prior to the start of a new session, as described above with reference to FIG. 9. In an example embodiment, a signature by the cashier access key 129 identifies the merchant, merchant device 120, date, time and/or location where the withdrawal record was created. Because of the access/permission limitations of the cashier access key 129, the withdrawal record must be certified by the remote system 160. In an example embodiment, the withdrawal record is maintained in the transaction history of smart card 110 and may be accessed/read by a merchant device 120 during future transactions.

In block 540, the merchant device 120 transmits the signed withdrawal record to the smart card 110. In an example embodiment, the merchant device 120 writes the withdrawal record to the smart card 110 using the cashier access key 129. In an example embodiment, the merchant device 120 writes a new transaction record to the smart card 110 illustrating the recent withdrawal transaction. The withdrawal transaction record comprises the transaction amount and a new sum of withdrawals as calculated by the merchant device 120. In an example embodiment, the merchant device 120 creates a new withdrawal record and adds the record to the transaction history previously transmitted from the smart card 110 at block 525. In an example embodiment, the withdrawal record also can comprise the smart card identification, a time stamp, the merchant identification, the amount of the withdrawal, the cashier access key 129 signature and other suitable information. In an example embodiment, the smart card identification can comprise the card account number and the card verification number.

In an example embodiment, the merchant device 120 increments the monotonic counter 117 resident on the smart card 110. In an example embodiment, the session access key 129 resident on the merchant device 120 is utilized to increment the monotonic counter 117. In an example embodiment, the monotonic counter 117 may be incremented by the amount of the withdrawal transaction. In an alternative example embodiment, the monotonic counter 117 may be incremented by a fixed number representing the withdrawal transaction. For example, for each withdrawal transaction, the monotonic counter 117 may be incremented by one. In an example embodiment, the monotonic counter 117 is capable only of being increased, not decreased.

In an example embodiment, a different merchant device 120 cannot verify a withdrawal record signed by another merchant device 120. Each cashier access key 129 is unique to a particular merchant device 120 and not capable of being read by or verified by a different merchant device 120. Therefore, certification by the cashier signing key 167 resident only on the remote system 160 is required to verify a withdrawal transaction.

From block 540, the method 500 proceeds to block 545. In block 545, the merchant device 120 indicates that the transaction was successful, and the secure communication channel 130 is terminated, in block 550.

In block 560, the merchant device 120 determines whether it has network 140 access to the remote system 160.

If the merchant device 120 does not have network 140 access, the merchant device 120 stores the smart card 110 identification information and transaction history (including the newly-added record and any deposit confirmations) until network 140 access is available.

If the merchant device 120 has network 140 access, the merchant device 120 establishes a communication channel with the remote system 160, in block 565.

In block 570, the merchant device 120 transmits the card identification information, any signed withdrawal records and the transaction history to the remote system 160. In an example embodiment, the transaction histories comprise one or more deposit confirmations. In an example embodiment, the withdrawal transaction occurs when the merchant device 120 has network 140 access, allowing for simultaneous transmission of the smart card 110 transaction history to the remote system 160. In this embodiment, the remote system 160 may perform the identification of the smart card in block 520. In an alternative embodiment, the withdrawal transaction occurs when the merchant device 120 is without network 140 access. In this embodiment, the merchant device 120 may perform the identification of the smart card in block 520 and store the card identification information and transaction history to be transmitted to the remote system 160 at a later time.

In block 573, the remote system 160 authorizes and certifies the withdrawal record using the cashier signing key 167. In an example embodiment, the remote system 160 reviews the signed withdrawal request and authorizes the cashier access key 129 signature. The remote system 160 accesses a master key to confirm that authenticity of the cashier access key 129 signature. In an alternative example embodiment, the remote systems 160 may review additional details, such as the number of transactions performed during the session, any geographic location restraints, any restrictions on size or amount of withdrawals allowed, and/or any additional possible restraints placed on the cashier access key 129 to confirm the key is active.

In an example embodiment, the withdrawal transaction occurred while the merchant device 120 had network 140 access and the merchant device 120 transmits the certified withdrawal record to the smart card 110. In an alternative example embodiment, the withdrawal transaction occurred offline, without network 140 access and the certified withdrawal record is not transmitted to the smart card 110 until the next transaction that occurs during network 140 access. In an example embodiment, the certified withdrawal record comprises the new sum of withdrawals, the card identification, a time stamp, a merchant identification, a signature by the cashier access key 129 and certification by the cashier signing key 167.

In block 574, the remote system 160 determines whether a deposit confirmation is required. In an example embodiment, the remote system 160 identifies deposit transactions wherein it has not received a deposit confirmation and flags these transactions as needing updating. In an alternative example embodiment, the deposit transaction is not written to the smart card 110 account until the deposit confirmation is received. In another alternative example embodiment, the deposit transaction is recorded in a "pending" transaction table in the smart card 110 account and then recorded in an "approved" transaction table in the smart card 110 account once the deposit confirmation is received. In an example embodiment, the remote system 160 knows it is suppose to receive a deposit confirmation after reviewing the smart card 110 account and is signaled to review the transaction history for such confirmation. In an alternative example embodiment, the remote system 160 receives a deposit confirmation for a transaction it did not authorize and can flag the transaction as potentially fraudulent.

In block 365, the remote system 160 updates the smart card 110 account to include the deposit confirmation. In an example embodiment, the transaction histories comprise one or more deposit confirmations. In this embodiment, the remote system 160 receives the deposit confirmation, determines whether the confirmation has been previously received by accessing the user account and reviewing the deposit records, and updates the user account to include the deposit confirmation as needed.

After the withdrawal transactions are certified and the smart card 110 account is updated to include any deposit confirmations, the remote system 160 analyzes and synchronizes the transactions, in block 270, which is similar to the block 270 referenced in FIG. 2. In an example embodiment, this action occurs in real-time with (in other words, immediately after) the transmission of the transactions to the remote system 160. In an alternative example embodiment, this action occurs at a later time or at a set durational time period (for example, once every 24 hours). The method 270 of synchronizing smart card 110 transactions on the remote system 160 is described in more detail hereinafter with reference to the methods described in FIG. 7.

In an example embodiment, a transaction made by mistake, may be reverted by a merchant. The merchant sends the original transaction identification to the remote system 160 and requests reversion of the transaction. In an example embodiment, the remote system 160 creates a new transaction for the same amount, but as an opposite type of transaction (for example, to revert a withdrawal, the transaction type would be a deposit). The original transaction is still maintained in the transaction history, but the smart card 110 balance is corrected the next time the smart card is connected to a merchant device 120 with network 140 access to the remote system 160.

In block 575, the secure communication channel is terminated.

Figure 7:
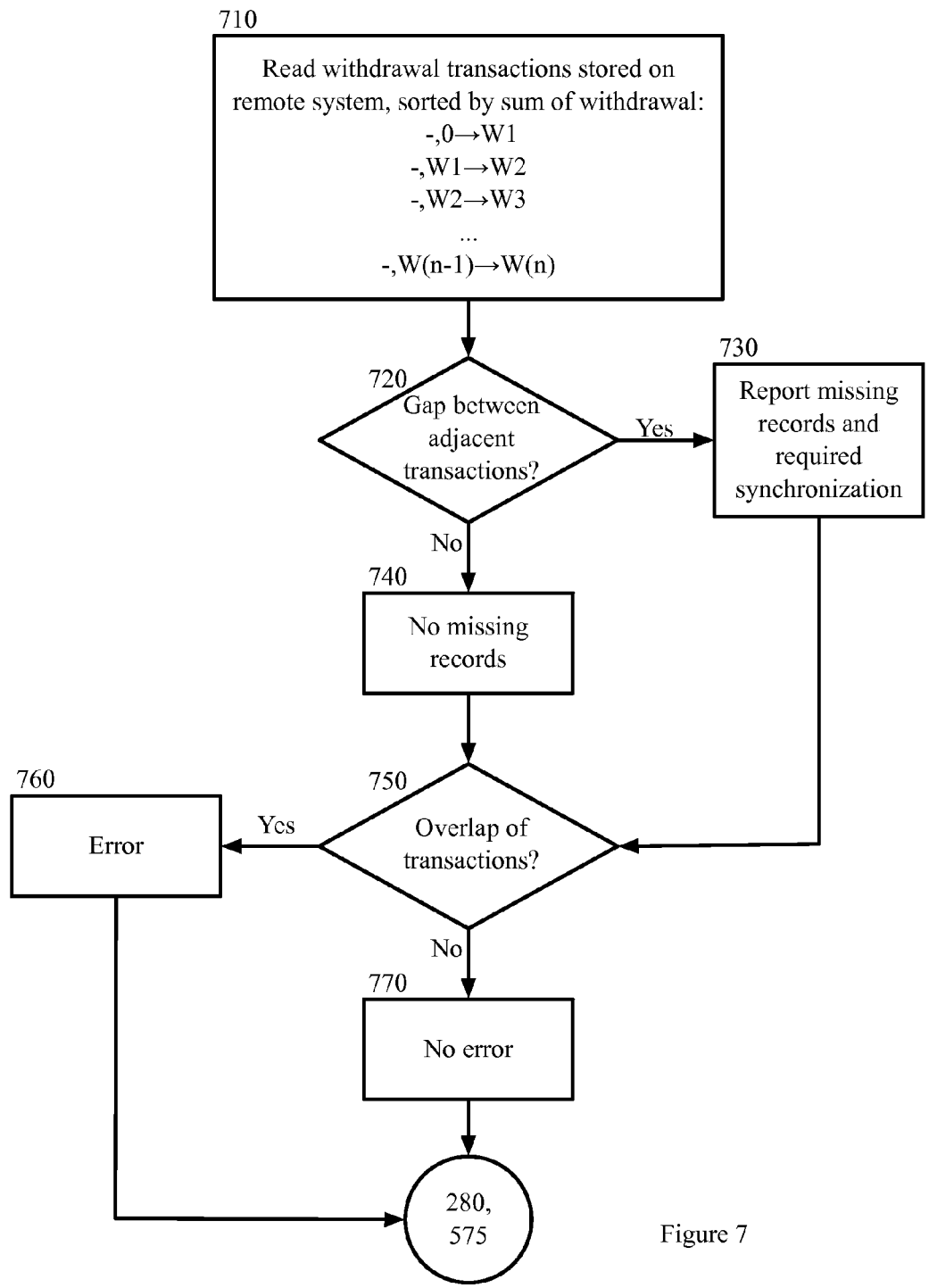
FIG. 7 is a block flow diagram depicting a method for synchronizing smart card transactions, in accordance with certain example embodiments.

FIG. 7 is a block flow diagram depicting a method for synchronizing smart card 110 transactions on a remote system 160, in accordance with certain example embodiments, as referenced in block 270 of FIGS. 2 and 5. The method 270 is described with reference to the components illustrated in FIG. 1.

The remote system 160 performs an analysis and synchronization of the smart card 110 transaction history received from the merchant device 120. In an example embodiment, the remote system 160 performs the analysis when the transaction history is transmitted. In an alternative example embodiment, the analysis is performed at set time intervals (for example, once every 24 hours). Because the deposit transactions are completed with network 140 access, an analysis of the deposit transactions is not required, as those deposit transactions are updated in the remote system 160 in real-time. In an alternative example embodiment, an analysis of the withdrawal and deposit transactions is performed.

In block 710, the remote system 160 reads the withdrawal transactions, sorted by the sum of withdrawals. For example, in an example embodiment:

-,0→W1
-,W1→W2
-,W2→W3
. . .
-,W(n−1)→W(n), where "W" is a withdrawal transaction.

In block 720, the remote system 160 determines whether a gap exists between adjacent withdrawal transactions.

If a gap exists between adjacent transactions, the remote system 160 determines whether transaction records are missing and a synchronization is needed, in block 730. For example, the following sum of withdrawal records indicate a missing transaction:
- –,0→4
- –,4→12
- –,19→21 (missing transaction between 12 and 19).

Thus, the remote system 160 has information indicating the current sum of withdrawals for the smart cart 110 (which sum is 21), even though the remote system 160 does not have a transaction record (–,12→19) corresponding to the withdrawal of 7 from the smart card 110. This missing record scenario is indicative of an offline transaction (–,12→19) occurring between two online transactions (–,4→12 and –,19→21). Alternatively, one or both of the transactions bounding the missing transaction could have occurred offline and have since been communicated to the remote system 160 when the corresponding merchant device 120 obtained network 140 access to the remote system 160. Additionally, because the sum of withdrawals maintained on the card is current, even after an offline transaction, the balance of the card can be determined at the point of sale for the next merchant.

Synchronization will occur when the transaction record for the missing transaction is communicated to the remote system 160, which occurs when the corresponding merchant device 120 obtains network 140 access to the remote system 160. Then, the remote system 160 can analyze the transaction history to determine that all transaction records are included.

The sum of deposits could be analyzed in a similar manner if a deposit transaction is allowed to be performed offline.

From block 730, the method 270 proceeds to block 750.

Referring back to block 720, if a gap does not exist in adjacent transactions, the remote system 160 determines all records are present in block 740. From block 740, the method 270 proceeds to block 750.

In block 750, the remote system 160 determines whether overlapping transactions exist in the transaction history for the smart card 110.

If overlapping transactions exist, the remote system 160 determines an error has occurred (for example, a withdrawal occurred without writing a record to the smart card 110), in block 760. For example, the following illustrates an overlapping transaction:
- –,0→4
- –,4→12
- –,4→8 (overlapping transaction as two transactions begin with a sum of withdrawals of –4).

If an overlapping transaction exists, the method 270 proceeds to block 760 in which the remote system 160 reports an error in the transaction history for the smart card 110 and deactivates the smart card 110 from further use.

Referring back to block 750, if overlapping transactions do not exist, the method 270 proceeds to block 770. In block 770, the remote system 160 determines errors do not exist.

From blocks 760 or 770, the method 270 proceeds to block 280 of FIG. 2 or block 575 of FIG. 5, as appropriate.

In an example embodiment, the remote system 160 maintains a list of blocked (deactivated) smart cards 110. The device reader 150 and merchant device 120 receive a list of blocked smart cards 110 when connected to the remote system 160. Transaction requests from a blocked smart card 110 are rejected.

Other Example Embodiments

Figure 11:
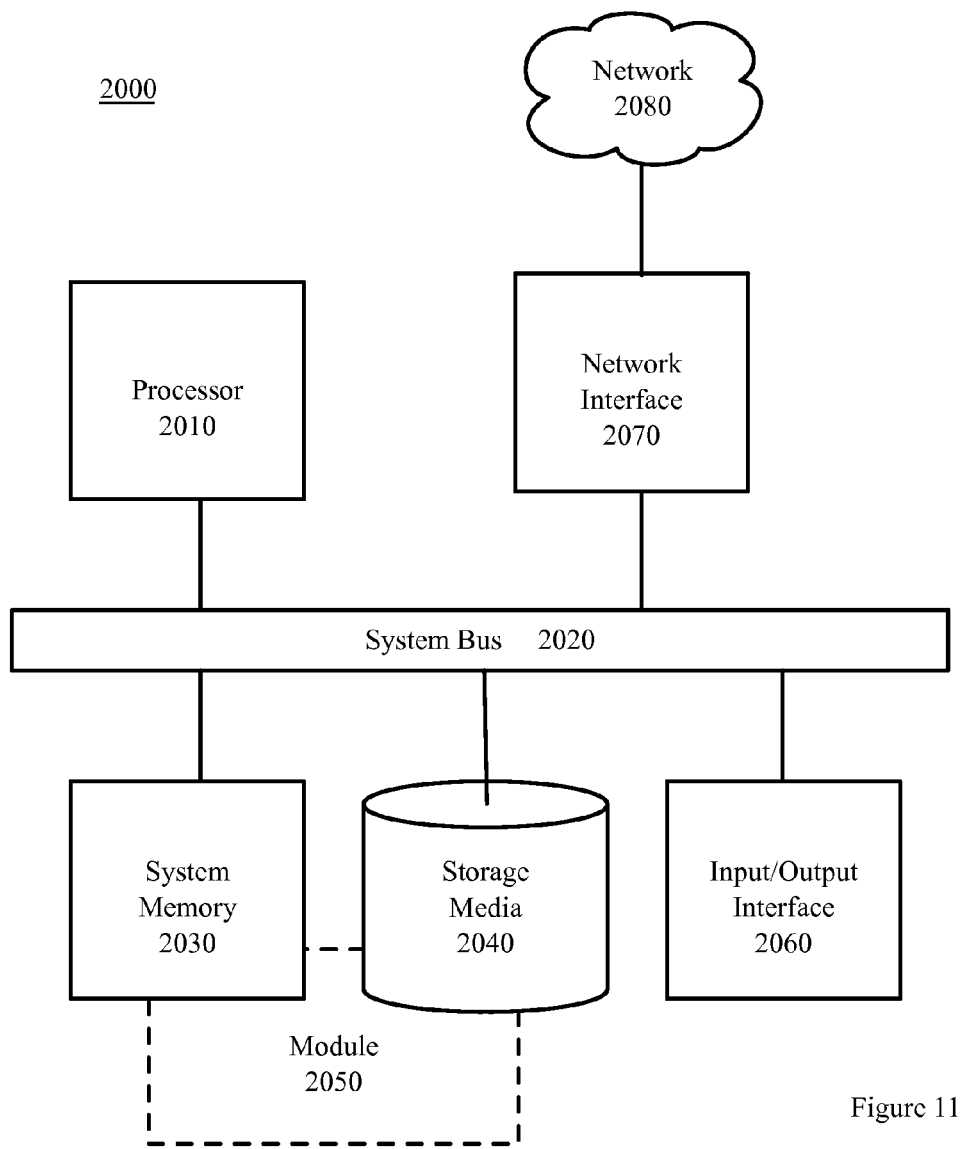
FIG. 11 is a block diagram depicting a computer machine and module, in accordance with certain example embodiments.

FIG. 11 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a Smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to deposit funds onto smart card computing devices, comprising:

establishing, by a merchant computing device, a first network communication channel with a management computing system that manages an account associated with a smart card computing device;

transmitting, by the management computing system via the first communication channel, a teller access key to the merchant computing device;

establishing, by the merchant computing device, a second network communication channel with the management computing system;

establishing, by the merchant computing device, a proximity communication channel with the smart card computing device;

receiving, by the merchant computing device via the proximity communication channel, a smart card account number, a smart card verification number, and a smart card transaction history comprising a listing of previous deposit transactions and a listing of previous withdrawal transactions;

receiving, by the management computing system and via the second network communication channel from the merchant computing device, the smart card computing device transaction history and a deposit transaction request to credit a deposit transaction amount to the account associated with the smart card computing device, the deposit transaction request comprising the smart card account number, the smart card verification number, a deposit transaction record, and a certification by the merchant computing device using the teller access key;

authorizing, by the management computing system, the deposit transaction request by:

verifying, by the management computing system, an identity of the smart card computing device based at least in part on the smart card account number and the smart card verification number;

verifying, by the management computing system, the identity of the merchant computing device based on the certification by the merchant computing device using the teller access key from the deposit transaction request;

certifying, by the management computing system, the deposit transaction record with a teller signing key signature based on the verification of the identity of the smart card and the identity of the merchant computing device, the teller signing key signature certifying the identity of the smart card computing device and the user merchant computing device;

synchronizing, by the management computing system, a first transaction history maintained in the account associated with the smart card computing device with the smart card computing device transaction history received from the merchant computing device by:

analyzing the listing of previous withdrawal transactions, capturing one or more offline withdrawal transactions missing from the first transaction history, and determining one or more offline withdrawal transactions are missing from the smart card computing device transaction history;

writing, by the management computing system, the deposit transaction record to the account associated with the smart card computing device;

transmitting, by the management computing system, the certified deposit transaction record to the merchant computing device;

transmitting, by the merchant computing device, the certified deposit transaction record to the smart card computing device; and receiving, by the management computing system, a second transaction history for the smart card computing device comprising a second listing of previous withdrawal transactions and a second listing of previous deposit transactions, the second listing of previous deposit transactions comprising a deposit confirmation indicating that the deposit transaction record was transmitted to the smart card computing device by the merchant computing device and that the deposit transaction request was completed.

2. The computer-implemented method of claim 1, wherein the second transaction history is received by the management computing system during a second deposit transaction.

3. The computer-implemented method of claim 1, wherein the second transaction history is received by the management computing system from a second merchant computing device during the second deposit transaction.

4. The computer-implemented method of claim 1, wherein the second transaction history is received by the management computing system during a withdrawal transaction.

5. The computer-implemented method of claim 4, wherein the second transaction history is received by the management computing system from a second merchant computing device during the withdrawal transaction.

6. The computer-implemented method of claim 1, wherein
the merchant computing device is a mobile telephone.

7. The computer-implemented method of claim 1, wherein
the merchant computing device is a smart card computing device reader.

8. A computer program product, comprising:
a first non-transitory computer-readable medium having a first computer-readable program instructions embodied thereon that when executed by a merchant computing device cause the merchant computing device to perform first operations of:
establishing a first network communication channel with a management computing system that manages an account associated with a smart card computing device;
receiving, via the first network communication channel from the management computing system, a teller access key;
establishing a second network communication channel with the management computing system;
establishing a proximity communication channel with the smart card computing device;
receiving, via the proximity communication channel from the smart card computing device, a smart card account number, a smart card verification number, and a smart card transaction history comprising a listing of previous deposit transactions and a listing of previous withdrawal transactions;
transmitting, via the second network communication to the management computing system, the smart card computing device transaction history and a deposit transaction request to credit a deposit transaction amount to the account associated with the smart card computing device, the deposit transaction request comprising the smart card account number, the smart card verification number, a deposit transaction record, and a certification by the merchant computing device using the a teller access key;
receiving a certified deposit transaction record from the management computing system; and
transmitting the certified deposit transaction record to the smart card computing device;
a second non-transitory computer-readable medium having a second computer-readable program instructions embodied thereon that when executed by the management computing system cause the management computing system to perform second operations of:
transmitting the teller access key to the merchant computing device via the first communication channel;
receiving, from the merchant computing device via the second network communication channel, the deposit transaction request and the smart card computing device transaction history;
authorizing the deposit transaction request by:
verifying an identity of the smart card computing device based at least in part on smart card computing device account identity and verifying an identity of the merchant computing device based on the certification by the merchant computing device using the teller access key from the deposit transaction request;
certifying the deposit transaction record with a teller signing key signature based on the verification of the identity of the smart card and the identity of the merchant computing device, the teller signing key signature certifying the identity of the smart card computing device and the identity of the merchant computing device;
synchronizing a first transaction history maintained in an account associated with the smart card computing device with the smart card computing device transaction history received from the merchant computing device by:
analyzing the listing of previous withdrawal transactions, capturing one or more offline withdrawal transactions missing from the first transaction history, and
determining one or more offline withdrawal transactions are missing from the smart card computing device transaction history;
writing the deposit transaction record to the account associated with the smart card computing device; and
transmitting the certified deposit transaction record to the merchant computing device; and
receiving, by the management computing system, a second transaction history for the smart card computing device comprising a second listing of previous withdrawal transactions and a second listing of previous deposit transactions, the second listing of previous deposit transactions comprising a deposit confirmation indicating that the deposit transaction record was transmitted to the smart card computing device by the merchant computing device and that the deposit transaction request was completed.

9. The computer program product of claim 8, wherein the second transaction history is received by the management computing system during a second deposit transaction.

10. The computer program product of claim 8, wherein the second transaction history is received by the management computing system from a second merchant computing device during the second deposit transaction.

11. The computer program product of claim 8, wherein the second transaction history is received by the management computing system during a withdrawal transaction.

12. The computer program product of claim 11, wherein the second transaction history is received by the management computing system from a second merchant computing device during the withdrawal transaction.

13. A system to deposit funds onto smart card computing devices, comprising:

a merchant computing device, comprising a merchant computing device storage medium and a merchant computing device processor communicatively coupled to the merchant computing device storage medium, wherein the merchant computing device processor executes application code instructions that are stored in the merchant computing device storage medium to cause the merchant computing device to:
establish a first network communication channel with a management computing system that manages an account associated with a smart card computing device;
receive, via the first communication channel, a teller access key to the merchant computing device;
establish a second network communication channel with the management computing system;
establish a proximity communication channel with a smart card computing device;
receive, via the proximity communication channel from the smart card computing device, a smart card account number, a smart card verification number, and a smart card transaction history comprising a listing of previous deposit transactions and a listing of previous withdrawal transactions;
create a deposit transaction request to credit a deposit transaction amount to a smart card computing device, the deposit transaction request comprising the smart card account number, the smart card verification number, a deposit transaction record, and a certification by the merchant computing device using the teller access key;
and
transmit, via the second communication channel to the management computing system, the deposit transaction request and the smart card computing device transaction history;
receive a certified deposit transaction record from the management computing system;
transmit the certified deposit transaction record to the smart card computing device; and
the management computing system, comprising a storage medium and a processor communicatively coupled to the storage medium, wherein the processor executes application code instructions that are stored in the storage medium to cause the management computing system to:
transmit the teller access key to the merchant computing device via the first communication channel;
receive the deposit transaction request and the smart card computing device transaction history from the merchant computing device via the second communication channel;
authorize the deposit transaction request by:
verify an identity of the smart card computing device based at least in part on the smart card account number and verify an identity of the merchant computing device based on the certification by the merchant computing device using the teller access key;
certify the deposit transaction record with a teller signing key signature based on the verification of the identity of the smart card and the identity of the merchant computing device, the teller signing key signature certifying the identity of the smart card computing device and the identity of the merchant computing device;
synchronize a first transaction history maintained in an account associated with the smart card computing device with the smart card computing device transaction history received from the merchant computing device by:
analyzing the listing of previous withdrawal transactions, capturing one or more offline withdrawal transactions missing from the first transaction history, and
determining one or more offline withdrawal transactions are missing from the smart card computing device transaction history;
write the deposit transaction record to the account associated with the smart card computing device; and
transmit the certified deposit transaction record to the merchant computing device; and
receive a second transaction history for the smart card computing device comprising a second listing of previous withdrawal transactions and a second listing of previous deposit transactions, the second listing of previous deposit transactions comprising a deposit confirmation indicating that the deposit transaction record was transmitted to the smart card computing device by the merchant computing device and that the deposit transaction request was completed.

14. The system of claim 13, wherein the second transaction history is received by the management computing system during a second deposit transaction.

15. The system of claim 13, wherein the second transaction history is received by the management computing system from a second merchant computing device during the second deposit transaction.

16. The system of claim 13, wherein the second transaction history is received by the management computing system during a withdrawal transaction.

17. The system of claim 16, wherein the second transaction history is received by the management computing system from a second merchant computing device during the withdrawal transaction.

* * * * *